(12) United States Patent
Weiss

(10) Patent No.: US 6,534,103 B2
(45) Date of Patent: Mar. 18, 2003

(54) CONTROL APPARATUS AND METHODS FOR POPPING POPCORN

(75) Inventor: Ronald R. Weiss, Okeana, OH (US)

(73) Assignee: Gold Medal Products Company, Cincinnati, OH (US)

( * ) Notice: Subject to any disclaimer, the term of this patent is extended or adjusted under 35 U.S.C. 154(b) by 0 days.

(21) Appl. No.: 10/041,195

(22) Filed: Jan. 8, 2002

(65) Prior Publication Data

US 2002/0061348 A1 May 23, 2002

Related U.S. Application Data

(60) Division of application No. 09/420,479, filed on Oct. 19, 1999, now Pat. No. 6,352,731, which is a continuation-in-part of application No. 09/212,667, filed on Dec. 16, 1998, now Pat. No. 6,000,318, which is a division of application No. 08/910,756, filed on Aug. 13, 1997, now Pat. No. 5,871,792, which is a division of application No. 08/633,580, filed on Apr. 17, 1996, now Pat. No. 5,743,172, which is a continuation-in-part of application No. 08/345,303, filed on Nov. 28, 1994, now Pat. No. 5,694,830.

(51) Int. Cl.$^7$ ................................................. A23L 1/00
(52) U.S. Cl. ..................... 426/233; 99/323.5; 99/323.7; 99/323.8; 99/344; 426/438; 426/450; 426/523
(58) Field of Search .............................. 426/233, 438, 426/450, 523; 99/323.5, 323.7, 323.8, 344, 468, 486, 330, 331, 337

(56) References Cited

U.S. PATENT DOCUMENTS

| | | | |
|---|---|---|---|
| 1,218,341 A | 3/1917 | Truitt ........................... 219/400 |
| 1,477,704 A | 12/1923 | Holcomb et al. ........... 99/323.9 |
| 1,545,357 A | 7/1925 | Schwimmer ............... 99/323.8 |
| 1,704,133 A | 3/1929 | LeClaire ..................... 99/323.8 |
| 1,786,877 A | 12/1930 | Thompson .................. 99/323.9 |
| 1,789,902 A | 1/1931 | Jackson ..................... 99/232.7 |
| 1,977,831 A | 10/1934 | Marshall et al. ........... 221/47.1 |
| 2,017,293 A | 10/1935 | Priest ............................... 53/4 |
| 2,027,698 A | 1/1936 | Parks et al. ....................... 53/4 |
| 2,034,484 A | 3/1936 | Pagendarm ................... 194/48 |
| 2,123,663 A | 7/1938 | Roach .............................. 53/4 |
| 2,134,682 A | 11/1938 | Burch .......................... 219/44 |
| 2,230,460 A | 2/1941 | Kleinwachter .............. 312/121 |
| 2,232,954 A | 2/1941 | Manley ........................... 53/4 |
| 2,248,812 A | 7/1941 | Cretors ............................ 53/4 |
| 2,254,271 A | 9/1941 | Cretors ............................ 53/4 |
| 2,458,190 A | 1/1949 | Newburger ................... 219/19 |
| 2,529,877 A | 11/1950 | Ladge ........................... 34/88 |
| 2,536,298 A | 1/1951 | Manley ..................... 99/238.1 |
| 2,575,643 A | 11/1951 | Tamsen ....................... 34/225 |

(List continued on next page.)

FOREIGN PATENT DOCUMENTS

| | | |
|---|---|---|
| CA | 682731 | 3/1964 |
| EP | 0364071 A2 | 4/1990 |

Primary Examiner—George C. Yeung
(74) Attorney, Agent, or Firm—Wood, Herron & Evans, LLP

(57) ABSTRACT

Apparatus and methods for popping popcorn comprise a heated kettle which is controlled and monitored according to the temperature of the kettle. The kettle is initially heated to a start cook temperature and a buzzer and light alert an operator to add uncooked popcorn and oil to the kettle which lowers the temperature of the kettle below a predetermined start temperature and initiates a cooking cycle. An oil pump system is enabled at the initiation of the cooking cycle for adding oil to the kettle. As the popcorn and oil cook, the kettle temperature increases and passes through a predetermined dump temperature and the kettle automatically tilts and dumps the cooked popcorn. After the dump, the kettle temperature increases to the start cook temperature again and the buzzer and light are activated to alert the operator to add another batch of ingredients for consecutive batches of popcorn.

18 Claims, 12 Drawing Sheets

U.S. PATENT DOCUMENTS

| | | | |
|---|---|---|---|
| 2,646,189 A | 7/1953 | Wickesberg | 222/36 |
| 2,743,633 A | 5/1956 | Powell | 81/9.51 |
| 2,812,704 A | 11/1957 | Hawks | 99/238.2 |
| 2,848,937 A | 8/1958 | Martin | 99/238.3 |
| 2,856,841 A | 10/1958 | Cretors et al. | 99/238 |
| 2,859,015 A | 11/1958 | Spangler | 257/2 |
| 2,907,264 A | 10/1959 | Bushway | 99/238.3 |
| 2,939,379 A | 6/1960 | Schmitt | 99/238.4 |
| 2,984,169 A | 5/1961 | Bushway | 99/238.5 |
| 2,972,292 A | 12/1961 | Waas et al. | 99/238.4 |
| 3,095,326 A | 6/1963 | Green et al. | 118/11 |
| 3,102,032 A | 8/1963 | Lippert | 99/80 |
| 3,120,168 A | 2/1964 | Lippert | 99/238.3 |
| 3,197,076 A | 7/1965 | Chamblee | 222/146 |
| 3,223,291 A | 12/1965 | Thomas | 222/249 |
| 3,253,532 A | 5/1966 | Jones | 99/238.3 |
| 3,253,747 A | 5/1966 | Thomas | 222/88 |
| 3,254,800 A | 6/1966 | Baunach | 222/132 |
| 3,282,470 A | 11/1966 | Thomas | 222/166 |
| 3,294,546 A | 12/1966 | Fingerhut | 99/81 |
| 3,321,107 A | 5/1967 | Goven et al. | 222/2 |
| 3,512,989 A | 5/1970 | Smith | 99/81 |
| 3,554,115 A | 1/1971 | Manley | 99/238.3 |
| 3,584,586 A | 6/1971 | Manley et al. | 107/7 |
| 3,606,828 A | 9/1971 | Smith | 99/238.5 |
| 3,641,916 A | 2/1972 | McDevitt et al. | 99/238.3 |
| 3,645,422 A | 2/1972 | Cretors | 222/169 |
| 3,697,289 A | 10/1972 | Day et al. | 99/81 |
| 3,739,953 A | 6/1973 | Cretors | 222/318 |
| 3,783,820 A | 1/1974 | Hautly et al. | 118/19 |
| 3,812,774 A | 5/1974 | Day et al. | 99/323.8 |
| 3,930,966 A | 1/1976 | Takahashi et al. | 204/58 |
| 4,068,572 A | 1/1978 | Vogt | 99/447 |
| 4,094,446 A | 6/1978 | Brutsman | 222/146 |
| 4,120,236 A | 10/1978 | Blomberg | 99/323.9 |
| 4,133,456 A | 1/1979 | Corini | 222/146 |
| 4,171,066 A | 10/1979 | Hirose | 221/150 |
| 4,171,667 A | 10/1979 | Miller et al. | 99/323.6 |
| 4,178,843 A | 12/1979 | Crabtree et al. | 99/323.8 |
| 4,182,229 A | 1/1980 | VandeWalker | 99/323.6 |
| 4,206,695 A | 6/1980 | Cretors | 99/323.9 |
| 4,307,657 A | 12/1981 | Avery | 99/323.7 |
| 4,372,354 A | 2/1983 | Moore | 141/361 |
| 4,397,874 A | 8/1983 | Piotrowski | 426/450 |
| 4,421,146 A | 12/1983 | Bond et al. | 141/349 |
| 4,426,923 A | 1/1984 | Ohata | 99/468 |
| 4,438,682 A | 3/1984 | King et al. | 99/323.7 |
| 4,477,003 A | 10/1984 | Baker et al. | 222/642 |
| 4,484,697 A | 11/1984 | Fry, Jr. | 222/95 |
| 4,494,314 A | 1/1985 | Gell, Jr. | 34/10 |
| 4,557,399 A | 12/1985 | Redick, Jr. | 222/83.5 |
| 4,582,713 A | 4/1986 | Hirokawa et al. | 426/233 |
| 4,632,275 A | 12/1986 | Parks | 222/25 |
| 4,723,688 A | 2/1988 | Munoz | 222/88 |
| 4,727,798 A | 3/1988 | Nakamura | 99/323.9 |
| 4,763,568 A | 8/1988 | Kiczek | 99/323.5 |
| 4,850,120 A | 7/1989 | Stein | 34/88 |
| 4,919,308 A | 4/1990 | Majkrzak | 222/146.5 |
| 5,020,688 A | 6/1991 | Power | 221/150 A |
| 5,026,969 A | 6/1991 | Knepler et al. | 219/421 |
| 5,033,363 A | 7/1991 | King et al. | 99/323.7 |
| 5,035,173 A | 7/1991 | Stein et al. | 99/323.7 |
| 5,114,045 A | 5/1992 | Herpe | 222/105 |
| 5,121,857 A | 6/1992 | Hutchinson | 222/318 |
| 5,301,601 A | 4/1994 | Cretors | 99/323.5 |
| 5,404,797 A | 4/1995 | Millar | 99/357 |
| 5,555,792 A | 9/1996 | Stein et al. | 99/323.9 |
| 5,590,582 A | 1/1997 | Weiss | 99/323.5 |
| 5,657,684 A | 8/1997 | Chaikowsky | 99/323.7 |
| 5,662,024 A * | 9/1997 | Cretors et al. | 99/323.7 |
| 5,694,830 A | 12/1997 | Hodgson et al. | 99/323.7 |
| 5,743,172 A | 4/1998 | Weiss et al. | 99/323.7 |
| 5,771,779 A | 6/1998 | Stein et al. | 99/323.7 |
| 5,871,792 A | 2/1999 | Weiss et al. | 426/233 |
| 5,925,393 A * | 7/1999 | Stein et al. | 426/233 |
| 6,000,318 A | 12/1999 | Weiss et al. | 99/323.7 |
| 6,092,458 A | 7/2000 | Weiss et al. | 99/323.7 |
| 6,352,731 B1 | 3/2002 | Weiss | 426/233 |
| 6,354,191 B1 | 3/2002 | Weiss et al. | 99/323.7 |
| 6,412,395 B1 | 7/2002 | Weiss et al. | 99/323.7 |

* cited by examiner

CONTROL APPARATUS AND METHODS FOR POPPING POPCORN

RELATED APPLICATIONS AND PRIORITY

This application is a divisional of U.S. patent application Ser. No. 09/420,479 filed Oct. 19, 1999, now U.S. Pat. No. 6,352,731. That application is a continuation in part application of U.S. patent application Ser. No. 09/212,667, filed Dec. 16, 1998, now U.S. Pat. No. 6,000,318, entitled "Apparatus for Popping Popcorn," which application in turn is a divisional application of Ser. No. 08/910,756, filed Aug. 13, 1997, and entitled "Method for Popping Popcorn," now U.S. Pat. No. 5,871,792, which application in turn is a divisional application of application Ser. No. 08/633,580, filed Apr. 17, 1996, and entitled "Automatic Popcorn Popper with Thermal Controller," now U.S. Pat. No. 5,743,172, which application, in turn, is a continuation-in-part application of application Ser. No. 08/345,303, filed Nov. 28, 1994, and entitled "Automated Corn Popper," now U.S. Pat. No. 5,694,830, which applications and issued patents are incorporated herein by reference in their entirety.

FIELD OF THE INVENTION

This invention relates generally to popcorn poppers and more specifically to a automatic or manual popcorn poppers which produce popcorn in consecutive batches while reducing the amount of attention required from an operator and while producing a consistently high quality of popped corn. This invention also relates to an improved method for popping popcorn.

BACKGROUND OF THE INVENTION

Popcorn is mass-produced for sale at movies and other events in commercial popcorn poppers which include an enclosed, transparent cabinet containing a tiltable kettle suspended above a catch area or platform. The kettle is heated and uncooked popcorn kernels are placed therein to be cooked and popped. Once the kernels are popped, the kettle is manually tilted and the popcorn spills onto the platform to be scooped up, packaged and sold to customers.

Conventionally, commercial popcorn poppers have been manually operated and have required an operator's constant attention for cooking the kernels and subsequently dumping the popped popcorn. For example, an operator would load the kettle with popping oil and unpopped corn kernels and then listen and watch for the unpopped corn to pop. When the operator decided, somewhat arbitrarily, that the corn was sufficiently popped, they would then dump the kettle and spill the popcorn onto the serving platform. Additional oil and corn would then be added for the next batch. While such conventional popcorn poppers are generally effective in mass-producing popcorn; the constant attention they require prevents the operator from other important tasks, such as selling the popcorn and other concession products, taking money and generally servicing customers.

As may be appreciated, the multiple duties entrusted concessionaire operators are not conducive to having them constantly monitor a popcorn popper. If attention is diverted for an extended length of time, the popcorn is susceptible to being burned or overcooked. In addition to the waste of burned popcorn, the aroma of the burned popcorn is not attractive to customers and may actually discourage purchases. Furthermore, if the operator inadvertently dumps the burned corn onto the platform, it will contaminate the usable popcorn which has already been produced and may render the entire batch inedible and thus unusable. Still further, the results and mess from burned popcorn is not easy to clean. The kettle is hot and must be allowed to cool before the burned popcorn is removed and the kettle placed back in service.

Additionally, the arbitrary nature of the dumping process with conventional poppers makes them subject to messes associated with premature dumping. For example, if the operator mistakenly believes that the corn has been completely popped and the oil used when indeed uncooked corn and oil remains in the kettle, tilting the kettle will spill oil onto the serving platform and possibly onto the counter. Such spills ruin and waste popcorn and create a mess which must be cleaned, adding to the already numerous tasks of a concessionaire.

Still further, too much oil may be added for a particular cooking cycle, and even if the cooking cycle is completed, excess oil might be left, again resulting in a mess upon dumping of the batch. For example, one operator may load the uncooked corn and oil for a batch, and another operator may subsequently and inadvertently load more oil, believing it had not been added. The excess oil does not burn off or cook and remains in the kettle. Not only is a mess created upon dumping, but the excess oil may also foul the batch of popcorn.

Another drawback of conventional popcorn poppers is the inherent delays which will occur between cooked batches of popcorn. When the popcorn has been cooked and dumped, the operator may begin serving it to customers without replenishing the supply of corn and oil and starting the next batch. Therefore, the next batch of popcorn will not be produced until the operator consciously sets aside time from his other activities to do so. Such delays interrupt production rates and introduce inefficiencies into the operation which reduce popcorn sales.

It is also desirable to pop popcorn consistently so that it produces high quality consistent taste from batch to batch. The vagaries of prior systems leave much to chance in this regard so that batches of corn are undercooked, burned or the like and at the least are inconsistent in taste.

Still another but related drawback to conventional popping processes or mechanisms is that they sometimes provide inconsistent or improper heating of the popcorn so that proper expansion of the kernels upon popping is not achieved. Particularly, when the heat is too high, the steam from the kernel is prematurely forced out and the popped kernel is small. If the temperature is too low, the kernels do not experience proper hull expansion and brittleness at popping and the popped kernels are small. It will also be appreciated that small popcorn kernels reduce the yield of popped popcorn per unit of uncooked kernels, thus reducing the efficiency of the popping apparatus and raising the cost of the operation.

While one aspect of the invention herein lends itself to reduction of the vagaries of operational and processing circumstances as noted above, it is also noted that it is important for an operator to tend to the process at specific times, yet remaining free to handle other chores while the popping process is processing. For example, in many popping systems, it is desirable and even necessary for an operator to tend to loading the kettle with corn and oil for popping at an appropriate time in the cycle. It is also desirable for an operator to monitor or to cause dumping of popped corn from the kettle at a particular time to keep it from burning. Yet it is also desirable both that the popping process does not fully engage the operator doing the whole process and that his attention to the process is positively obtained at such times as loading and dumping.

In another aspect of the invention, it is recognized that in the past, various improvements in popcorn have been made by popcorn producers in the science and technology of the corn. These have resulted in improved taste, improved kernel expansion rates and more complete popping. Improvement in the popping machines or equipment to produce better popped products have not generally kept pace with the improvements in the corn. While there have been certain improvements in poppers directed to better popped corn products, such as in U.S. Pat. Nos. 5,743,172; 5,694,830 and 5,871,792, for example, there is still room for further equipment and process improvement to improve the final popcorn product.

In particular and as referred to above, it should be appreciated that popped popcorn should not be chewy, should have a high expansion ratio from the unpopped kernel, and should have about 12% to about 13% of the moisture of the raw, unpopped kernel. Popcorn meeting these parameters is highly desirable from a taste standpoint. Despite improvements in the corn kernels, however, these final desirable parameters require improvements in popping technology for consistency.

For example, if the moisture content of the kernel is reduced too fast in the popping process, the kernel pops prematurely, resulting in a small product. On the other hand, if the moisture content of the kernel is reduced too slowly, the hull first cracks, moisture leaks and the power of the remaining moisture is not sufficient to produce the desired expansion of the kernel for the final product. Thus the rate of application of heat to the corn is a factor in producing the most desirable popcorn.

In a typical popper, a covered heated popping kettle is generally used. Heating elements are usually mounted on the underside of the kettle and are controlled by a mechanical thermometer between on/off status to heat and pop the corn therein. In one instance, a thermocouple has been used. The elements are disposed on a heat dissipation plate or surface on the kettle bottom and have sufficient output to heat the kettle to a level in excess of the ultimate temperature desired after popcorn kernels and oil are loaded (which reduces kettle temperature from a control or preset temperature). The elements produce such excess heat in order to ensure that the appropriate popping temperature can be reached is a desired time period.

In other words, when relatively colder corn and oil are added to a heated kettle, the temperature drops, then climbs back to a desired temperature so that the kernels are exposed to a quantum of heat during a period necessary for popping. If the elements were not so powerful, the desired heat may eventually be attained but this could require an excessive duration of cooking time.

The graph in FIG. 8 of U.S. Pat. No. 5,871,792 demonstrates such a popping cycle. From a cold start with the kettle at an ambient temperature, the heating elements are turned on to warm the kettle. Its temperature rises to an "overshoot" level above a "control" level of about 525° F. The heating elements are then cycled on and off upon sensing by a mechanical thermometer so that kettle temperature cycles above and below the control temperature.

When the unpopped kernels and oil are loaded into the kettle, they are at ambient temperatures, much cooler than the kettle's control temperature, and act as a heat sink, thus reducing the kettle temperature, such as shown in the graph, down to about 325°, for example. The mechanical thermometer, for example, eventually sensing this drop, causes the heating elements to energize to raise the kettle temperature back up toward a temperature where the corn is considered to have been popped and can be dumped.

There are several areas in which this process could stand further improvement as will now be discussed.

Applicant has determined that an ideal cooking time of from about 3.0 minutes to about 3.5 minutes is preferred in order to produce the best tasting popcorn with the highest expansion ratio (largest size). Achievement of this ideal process requires close control of the heat energy of the kettle. If the initial heat energy of the kettle (i.e. considering kettle temperature and kettle mass) and/or the ability to recover after the corn and oil is loaded (i.e. considering temperature, mass and available wattage of heating elements) is too low or too high, the cooking cycle will be too slow or too fast respectively. When the cooking cycle is too slow or too fast, the popcorn will be too small, chewy and will have too many unpopped kernels.

Moreover, when the popping is first heated from a "cold start", on initial turn on, its temperature rise may be rapid, causing it to overshoot and reaching a higher temperature than initially desired. While controllers such as that disclosed in the aforementioned patents cited herein are useful in eliminating excessive overshoot in subsequent cycles, they have not been so advantageous for the initial cold start cycle or the first several popping cycles thereafter before the cooking system reaches a heating equilibrium. This can cause undesirable taste and quality variations in the initial popped corn batches.

In order to fully understand the cooking process and as background for the invention herein, it is helpful to articulate certain definitions, functions and structure of popcorn poppers. Generally, the kettle is as explained above and includes a covered heated kettle provided with heating elements for heating a heat dissipation plate or surface on the kettle bottom, and thus the kettle.

Based on the kettle construction, its mass, the materials of the kettle, etc. the power of the heat elements (watts) are determined to permit the kettle to recover from the temperature drop resulting from loading of the corn and oil. Then, one of the significant remaining variables is the temperature of the kettle, which determines the initial heat energy of the kettle. Thus, the "control temperature" (Tcontrol) means a preselected temperature of the cooking or popping surface of the kettle, which the controlling method or apparatus allows the kettle to approach before it is shut off in the first cycle from a cold start. The "load temperature" (Tload) means the preferred temperature of the cook or popping surface of the kettle at the time when corn kernels and oil is loaded into the kettle before the temperature drop. The "dump temperature" (Tdump) means the predetermined temperature of the cook or popping surface of the kettle when the corn has popped and the kettle is ready for dumping the popped corn. Typically in current poppers, Tload is greater than Tdump by a small percentage.

According to the invention, applicant has determined it is desired to produce enough heat in the corn to cause it to be popped when the kettle reaches a predetermined ump temperature at about 3.0 to 3.5 minutes after the kettle is loaded. Thus, according to the invention, the kettle should be controlled in each cycle such that a predetermined Tdump is reached within the ideal cycle time of about 3.0 minutes to about 3.5 minutes from the loading of kernels and oil to dumping of popped corn. This appears to produce the most consistently high quality, good tasting popcorn, the process of the invention disclosed herein is directed to reaching a predetermined and constant Tdump temperature for all situations. The potential variations of cooking time based on varying Tload temperature points are shown in the following graphs. These show the relationship of varied Tload temperatures and the initial heat energy of the kettle to the popping cycle in time.

FIG. 9 illustrates a situation where Tload is equal to Tdump. FIG. 10 illustrates a situation where Tload is greater than Tdump. FIG. 11 illustrates a situation where Tload is less than Tdump.

From these graphical illustrations, the following observations can be made:

First, the overall slopes of the curves are similar, just shifted up or down. This is because all three graphs assume the same heating elements and wattage, and the same kettle construction and mass.

Secondly, the popcorn has completed popping at the same Tdump temperature, independent of the Tload temperature of the kettle when the corn is loaded. This observation will be described later as one of the important concepts contemplated by the invention.

Thirdly, the loading of corn and oil at different Tload temperature extend or shorten respectively the duration of the cycle until reaching Tdump. This inconsistency of Tload most frequently occurs between the first or cold start cycle and the subsequent cycles. If kernels and oil are added at that time, i.e. a high Tload temperature, then the cycle time or duration may be too short. If the kernels and oil are added at a lower Tload temperature, too much before Tcontrol is reached, then the cycle time is extended beyond that time duration desired.

It will also be appreciated that varying "lag" factors are inherent in prior poppers, and that these lag factors prevent the close control of kettle energy now desired and which is provided by the invention herein.

Thus, if the Tcontrol temperature and the Tload temperature are maintained as closely as possible according to the invention, then the cycle duration can be more closely or accurately produced within the desired cycle time of about 3.0 to about 3.5 minutes.

Given the importance of keeping the Tload temperature substantially equal or as close to the Tdump temperature as possible for the best quality popcorn according to this invention, the challenge is to minimize the normal differences between heat energy imparted to the corn for the first cold start cycle and for the subsequent cycles. The differences can occur due to at least the following circumstances:

a. The point where the temperature sensor is located is separated from the cooking surface. This is related to the mass of the materials between the temperature sensor located on one hand and the cooking surface. The effect is a time and temperature lag between what the cooking surface temperature actually is, and what the remote temperature sensor and control "thinks" it is.

b. The surface where the heat elements are located is separated from the cooking surface by the kettle components, which also introduces a time and temperature lag. When the heat element is turned on or off, there is a lag before the cooking surface begins to react. There is also a small lag associated with the heat element itself. Thus the mass of material between the heating element and the actual cooking surface, as well as the rise time of the heat element itself involves an inherent temperature and time lag.

c. The traditional method of controlling temperature of a popcorn kettle which is by use of a "mechanical" thermostat, inaccuracy aside, or even a thermocouple with a set or nonprogrammable control inherent introduces its own time lag related to the mass and mechanical operation of such a sensor.

d. And perhaps most importantly, the fact that if the cold start cycle is controlled the same way as subsequent cycles, the initial Tload may be too low and the duration of that cycle, until Tdump is reached could be too long.

The various factors described above are amplified by the fact that the kettle's heat elements usually have far more power than is necessary to simply hold the kettle at a Tcontrol or Tload temperature. This is necessary to cook the popcorn in the required time, i.e. to bring up the temperature of the corn for popping in a desired time. With the lag times of many prior poppers, the net effect is a large overshoot of preferred control temperature as the kettle at least initially heats or an undershoot if the heat energy is turned off too soon because of an excessive sensed rise rate. By the time the mechanical thermostat or thermocouple reacts to turn off the heat, the kettle surface temperature could exceed Tcontrol by the overshoot. Also, even where a thermocouple is used, its own heat equilibrium may not be obtained during the first or first several cooking cycles and the accuracy and dose control of the cooking process desired is not initially obtained. Conversely, before the heat element turns on, the temperature will undershoot. The chart of FIG. 12 demonstrates this operation.

The thermal transients in the system are believed to be one of the be most significant of the factors generating this prior profile in those systems using such sensors. As mentioned above, there are two major problems with temperature sensors related to the effects described.

First, overshoot from a cold start. The operator does not know when to load the corn and oil from a cold start. If he puts the kernels and oil in too early, the quality of the popped corn will be poor. If he waits too long, he may "hit" the peak overshoot temperature which will also cause poor quality popped corn and may cause oil smoke.

When the PID controls heat rise from a cold start, the heat energy may be turned off too soon, but the lack of heat equilibrium results in less heat energy in the system and too long or time is required for the kettle to recover to Tdump after its first load.

Secondly, excessive popping cycle times due to low (and also due to high) kettle temperatures are undesirable. The low condition is obvious, but a high load temperature actually can cause lengthy popping cycles up to 5 minutes. The kettle's temperature sensor opens due to a high temperature. The overshoot permits the heat energy of the kettle to increase further. If the corn and oil are added at this time, the heat energy of the system falls quickly, but the higher sensed surface heat from the overshoot "feeds" the remote mechanical thermostat or thermocouple which keeps it from closing. By the time the heat energy in the kettle mass between the cooking surface and the remote sensor dissipates and the sensor does close and the heat elements are turned on, the kettle cannot recover to cook the popcorn close to the desired cycle time.

Accordingly, it is desired to produce a consistently higher quality popcorn through improved apparatus and popping processes.

Another objective of the invention has been to reduce popping kettle temperature overshoots and undershoots as a function of system parameters of prior popping systems.

Another objective of the invention has been to provide a consistently higher quality popped corn by more closely controlling the popping parameters of the corn poppers than in prior systems.

A yet further objective has been to overcome the information and problems generated by application of the control logic to both cold start and subsequent popping cycles.

A yet further objective of the invention has been to provide improved popped corn by insuring a consistent popping cycle within the duration of about 3.0 to about 3.5 minutes independently of the coincidence of the loading of kernel and oil with the temperature (Tload) for all cycles of the popper.

It is another objective of the present invention to provide improved apparatus and/or methods to pop popcorn continuously in consecutive batches with minimal attention by an operator.

It is another objective to ensure that the popcorn is consistently and properly cooked in each batch.

It is a further objective of the present invention to reduce the burning of popcorn sometimes associated with conventional machines and operator inattention.

It is also an objective of the invention to always provide the proper amount of cooking oil and thus reduce the messes associated with such burned popcorn or spilled, uncooked oil and thereby allow an operator to focus upon customers and popcorn sales.

It is a still further objective of the invention to reduce the delays between fresh batches of popcorn attributable to lack of attention by the operator.

It is a still further objective of the invention to increase the production rate of consecutive batches of fresh popcorn to thereby increase the sales from and the profitability of a commercial popcorn popper.

Still further, it is an objective to provide the proper and consistent heat to the kernels as they cook to ensure proper popping conditions and to maximize the popcorn yield per unit of kernels.

SUMMARY OF THE INVENTION

Addressing these objectives, the present invention comprises a popcorn popper which may be left unattended to automatically cook and dump popcorn once it has been loaded with the proper ingredients, such as uncooked popcorn. Alternately, features of the invention are also applicable to poppers with manually dumped kettles. The proper, premeasured amount of oil pump is then added by the oil pump system upon the initiation of a cooking cycle so that the operator does not have to worry about measuring oil or excess oil in the kettle. The popcorn popper of the invention is responsive to kettle temperature conditions to automatically cook popcorn kernels, subsequently dump the finished popcorn, and then alert the operator to load more ingredients such as oil and uncooked kernels, and start the next batch. In that way, all of the batches of fresh popcorn are properly cooked at regular periods with the proper amount of oil and heat, and the operator is left to attend to other tasks.

According to the invention, popcorn is consistently cooked by introducing an amount of popcorn and oil to a cooking system, comprising a heated kettle, for a duration sufficient to heat the corn and oil a predetermined amount, and then automatically dumping popped popcorn after a sufficient amount of heat energy has been absorbed by the corn and the oil to pop the corn. The application of heat energy to the corn and oil is not monitored and controlled by time, but rather by the heat conditions of the cooking system for each batch. In this regard, a kettle is heated to a start temperature and cycled about that temperature through a small temperature range. When unpopped corn and oil are introduced, a thermocouple on the kettle senses a temperature drop (cycle point) and a cooking or popping cycle begins. The corn and oil absorb the heat energy and are heated in the kettle until the kettle temperature climbs back to a predetermined temperature (dump point) indicating sufficient heat energy has been applied to the corn and oil to pop the corn. At that point, the kettle is automatically dumped.

Since the controller is temperature, rather then time responsive, the operator is assured a consistent amount of heat is always applied to the corn and oil for consistent popping. If the kettle dump was controlled by time alone, and the environment changed, such as a cabinet door being open, the cooking cycle might time out before sufficient heat energy was applied to consistently cook that batch of corn. Moreover, since the start temperature is held within a narrow predetermined range, the oil and corn will not be prematurely burned and the temperature gradients applied thereto will be more consistent. Also, such a method accommodates at least some variations in the amount of corn and oil introduced to the kettle. If too little, the temperature drop will not be as great and the rise to the predetermined dump temperatures takes a shorter time, thus sufficient but less heat is introduced so this batch is consistently popped. In a corresponding manner, larger amounts of corn and oil will slow the climb of temperature to the dump point insuring that sufficient heat is imparted to pop the corn consistently with other batches.

To further ensure proper cooking by the invention, a premeasured amount of oil is introduced to the kettle at the beginning of a cooking cycle. The controller is coupled to an oil pump system which is operably in fluid communication with the kettle. Upon the kettle reaching the proper start temperature or cooking temperature, the oil pump system and an oil pump switch are enabled. The operator then actuates the oil pump switch to activate the pump system and deliver a proper, premeasured amount of oil to the kettle. The oil pump system and switch are disabled by the controller if the kettle heat is not ON (no cooking cycle) or the kettle is tilted from an upright position, such as to be cleaned. Furthermore, in accordance with the principles of the present invention, the oil pump system will only deliver one load of oil per cooking cycle to prevent an oil overload or spilling of oil when the cooked batch of popcorn is dumped. Therefore, the oil pump switch may be actuated numerous times and only one load of oil will be delivered per cooking cycle.

In an alternative embodiment of the invention, the controller is operable to activate the oil pump system automatically upon the initiation of a cooking cycle. To that end, the controller provides an output signal to the oil pump system to pump a premeasured amount of oil to the kettle at a predetermined time in the cooking cycle. For example, the oil might be added when the kettle has risen to a start temperature or might be added after the popcorn has been added. If the oil pump system has a mechanically adjusted timer mechanism for pumping a premeasured amount, an output signal is provided by the controller to activate the pump and pump oil into the kettle. If the oil pump system includes a programmable timer mechanism, the controller is operable to provide additional timer outputs to adjust the amount of time that the pump will deliver oil when activated. In either case, a premeasured and proper amount of oil is delivered to the kettle each cooking cycle. The controller will not activate the pump system until the kettle is hot and ready to cook and is upright.

More specifically, the popper apparatus includes a kettle which is coupled to a dumping motor and a heater which are controlled by a controller which monitors the kettle temperature. The controller includes a temperature sensor, such as a thermocouple, which is operably connected to the kettle proximate the heaters. By monitoring the temperature of the kettle, the controller is operable to dump the kettle at the proper time and to alert the operator when another batch of uncooked corn kernels should be added to the kettle. Since the kettle temperature is constantly monitored, and the dump cycle is automatically controlled, the burning of popcorn is prevented. Furthermore, an operator does not have to constantly monitor the procedure to prevent such burning and can thus turn his attention to other tasks. The popper begins a cooking or popping cycle when fresh ingredients are added, and by alerting the operator at the end of each popping cycle, the popper effectively reduces the delay between batches to increase its productivity.

In a preferred embodiment of the invention, a programmable logic controller (PLC) is coupled to a temperature controller which, in turn, is coupled to a kettle thermocouple and to kettle heaters. When the popper is turned ON and the kettle heat is turned ON, the kettle is heated to an equilibrium start or cooking temperature of, for example, approximately 525° F. The thermocouple and temperature controller preferably maintain the desired 525° F. kettle cooking temperature in a small cycled range of +/−10° F. When the kettle has reached the equilibrium start temperature, the PLC activates indicators which provide visual and audible indications that the kettle is ready to make popcorn. The oil pump system and pump switch are enabled and the operator actuates the oil pump switch to load the oil which is pumped in by the oil pump, and also loads the uncooked popcorn kernels.

Alternatively, the oil might be loaded by hand by the operator. In still another alternative embodiment of the invention, as discussed above, the PLC provides outputs directly to the oil pump system to automatically pump oil to the kettle at the initiation of a cooking cycle. The PLC is operably coupled to the oil pump system to activate the pump for a predetermined amount of time to ensure a premeasured amount of oil. A timer determines how long the pump runs once activated to ensure the proper amount of oil. The invention may incorporate an oil pump system having a mechanically adjusted timer, such as a dial timer, or may incorporate a system having a separate programmable timer. In the latter case, the PLC is operable to provide separate output signals to the programmable timer to set the pump time in addition to any output signals to the pump for delivering oil for the amount of time set by the timer.

The temperature controller senses the rapid drop in kettle temperature associated with the absorption of heat from the kettle by the corn and oil. When the temperature drop exceeds a set amount, for example, 50° F. below the equilibrium start temperature, the PLC initiates a cooking cycle. The point of initiation of the cooking cycle is designated the cycle temperature or cycle point.

As the cooking cycle progresses, the PLC senses through the temperature controller, that the kettle has dropped to a minimum temperature below the cycle temperature. The minimum temperature will depend upon the heat load added to the kettle. As the popcorn pops, the temperature of the kettle begins to rise above the minimum temperature. When the kettle temperature reaches a predetermined dump temperature or dump point and the PLC that the minimum temperature was previously reached and was preceded by the cycle temperature, the popper indicates that the end of the cooking cycle has occurred. Preferably, the predetermined kettle dump temperature associated with the dump point for determining the end of a cooking cycle is equal to the cycle temperature associated with the start of the cooking cycle, i.e., approximately 50° F. below the equilibrium start temperature, for example. Upon sensing the end of the cooking cycle at the dump point, the PLC initiates a dump cycle and controllably energizes the dump motors to tilt the kettle and dump the finished popcorn onto the surface platform. The popcorn is immediately and automatically dumped at the end of a proper cooking cycle, therefore preventing the popcorn from burning. Furthermore, because of the unique temperature-driven control of the popper, the popcorn is consistently and properly cooked and may be served at the peak of freshness. The greater the amount of corn and oil added, the longer the cooking cycle. Conversely, the less the amount of corn and oil, the shorter the cooking cycle.

Preferably, the motors are controlled to dump the kettle twice to ensure complete dumping. After the first dump, the kettle is only partially returned to a cooking or popping position. It is then dumped again before fully returning to a popping position.

When the temperature controller indicates that the kettle temperature is below the cooking cycle point and the machine is in a cooking cycle, the PLC disables the dump motors and thus prevents inadvertent dumping of the kettle contents.

When the popcorn has been dumped at the end of a cooking cycle, the kettle will heat back up to the start cook point again, and audible and visual indications are again initiated to remind a busy operator to reload the kettle with fresh ingredients. This prevents delays in between consecutive batches of popcorn and thus increases the efficiency of the operator and the popcorn popper, increasing production rates and profitability.

The present invention provides the proper application of heat energy consistently to batches of corn kernels. In that way, the kernels are heated to a sufficient temperature to provide proper hull brittleness and expansion when the kernels pop but the heat is not so high so as to force out the steam in the kernel prematurely. Therefore, the invention achieves the desired corn temperature and peak steam pressure for proper expansion. Expansion rates of approximately 1:50 have been achieved with the invention which is a significant improvement over some conventional devices which achieve expansion rates of 1:44 or lower.

Therefore, the present invention automates the cooking and dumping of popcorn and eliminates the need for constant operator attention to the process. Production of consistently popped corn is increased as is the profitability of the operation while incidents of burned corn and inadvertently spilled oil or uncooked corn are eliminated. Furthermore, the temperature control of the kettle operation and the cooking cycle provides properly and consistently cooked batches of popcorn.

An alternative embodiment of the invention contemplates the use of a kettle-mounted thermocouple interconnected to an electronic control system for operating the kettle's heating elements, and a different control logic for the first heat rise of the kettle from a cold start condition. The thermocouple has negligible mass, is located on the bottom of the kettle, and is connected to the electronic control which will control voltage to the heat elements, depending on the desired thermocouple open and close temperatures. The overshoot and undershoot will thus be significantly less due to the elimination of some lag due to the use of remote mechanical thermostats in prior systems. Moreover, the control system is programmed to energize and deenergize the heating elements in response to the sensing conditions of the thermocouple at temperatures which lead to the desired cook surface temperatures as a function of kettle mass and heating element lags in both directions (i.e. temperature rises and drops). Thus, the thermocouple sensed temperatures are handled by the control system as a function of the desired temperatures taking into consideration kettle mass and other lag factors so the heat energy that the corn kernels experience is closely controlled to predetermined levels.

The cold start problems noted above are prevented by directly controlling the application of heat to the kettle on the start up, outside of the normal control loop. In particular, heat energy input is not retarded or controlled so quickly as it is later when the structure has reached heat equilibrium. Thus, the program for normal operation is varied for the first cycle to insure that batch is consistently popped within the desired time frame as subsequent batches. The system then returns to normal control mode. Thus, the control system recognizes the cold start situation for the first cycle.

In other words, on cold start, the control system logic for remaining cycles is not applied to the kettle heat. Instead, the temperature rise is allowed to continue to a point beyond where it would be allowed to rise for subsequent cycles when the kettle has reached equilibrium. In this manner, the kettle is allowed to heat to a higher point, recognizing that total heat in the system is less than it will be later. Thus, when corn and oil are added and the temperature drops, the higher start temperature supports the kettle's recovery to a Tdump temperature in a similar time frame to that of subsequent cycles. Without the "override" of the control logic for the first cold start cycle, the heat energy would be retarded sooner and corn loading would drop the colder kettle to a much lower temperature than desired, from where it could take an excessive time to recover.

The chart of FIG. 13 illustrates the contrast between the invention and the prior systems.

It will be appreciated that Tdump, according to the invention, is constant and independent of Tload. According to the invention, Tdump is independent of many other variables, including:

Low voltage, which reduces the power of the heat elements.

Variations in the amount of corn and/or oil that are added to the kettle.

Variations in the kettle components: heat elements, etc.

The system is thus controlled that, given the same Tdump, temperature popping time will vary only within the desired cycle time of about 3.0 to about 3.5 minutes for every cycle.

In another aspect of the invention, and even where an automatic dump mode is or is not selected, or in other poppers where there is no automatic dump mode, the electronic control system is operable to sound audible or visual alarms, such as a buzzer or flashing light, to alert the operator to dump the popcorn at the correct time. Also, such alarms are programmed to alert the operator to do one of the following three things according to the invention:

1. From a cold start, an alarm signals when the operator should first add the corn and oil.
2. When popping, an alarm signals when to dump the popcorn. The larger benefit is the fact that it alerts the operator, who is busy or distracted, to dump the popcorn before it burns. Burned popcorn is a significant problem in a busy theatre, for example.
3. When the operator is done popping corn, an alarm reminds him to turn off the master power to the kettle heat to save energy.

The invention also contemplates the process of producing popcorn by popping corn kernels in oil for a time period of about 3.0 to about 3.5 minutes from loading kernels and oil into a popping kettle to dumping popped corn therefrom. That is, the invention contemplates the popping of popcorn in a time duration from loading kernals and oil into a kettle to dumping popped corn therefrom in a time period of from about 3.0 to abut 3.5 minutes and after a set Tdump temperature is reached, regardless of typical variations in the quality of corn and oil added by operator error and variations in the Tload temperature between cold start and later cycles.

According to the invention, a preset Tcontrol temperature thus defines a maximum Tload for the first cold start cycle and thereafter for subsequent cycles, function as a safety or cutoff temperature, causing a system shutdown when reached for review and safety considerations.

Advantages of the invention are numerous. It produces a high quality, consistent, popped product. It eliminates lag times of the prior temperature sensors used in prior popping systems. It reduces temperature overshoots and undershoots from a desired control temperature. It assures a predetermined cycle time within a set range and with a consistent product. It produces a high quality consistent product independent of variables inherent in prior systems which limit product consistency. It provides a close control of popping parameters, including close control of kettle energy to produce a non-consistently high quality product.

It will also be appreciated that the invention in its alternate embodiment can be used in controlling only the initial cold start cycle differently from the subsequent cycles or the first several cycles from a cold start in the same way, differently from remaining cycles when heat equilibrium is reached.

These and other objectives and advantages will become readily apparent from the following detailed description of preferred and alternative embodiments of the invention, and from the drawings in which:

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
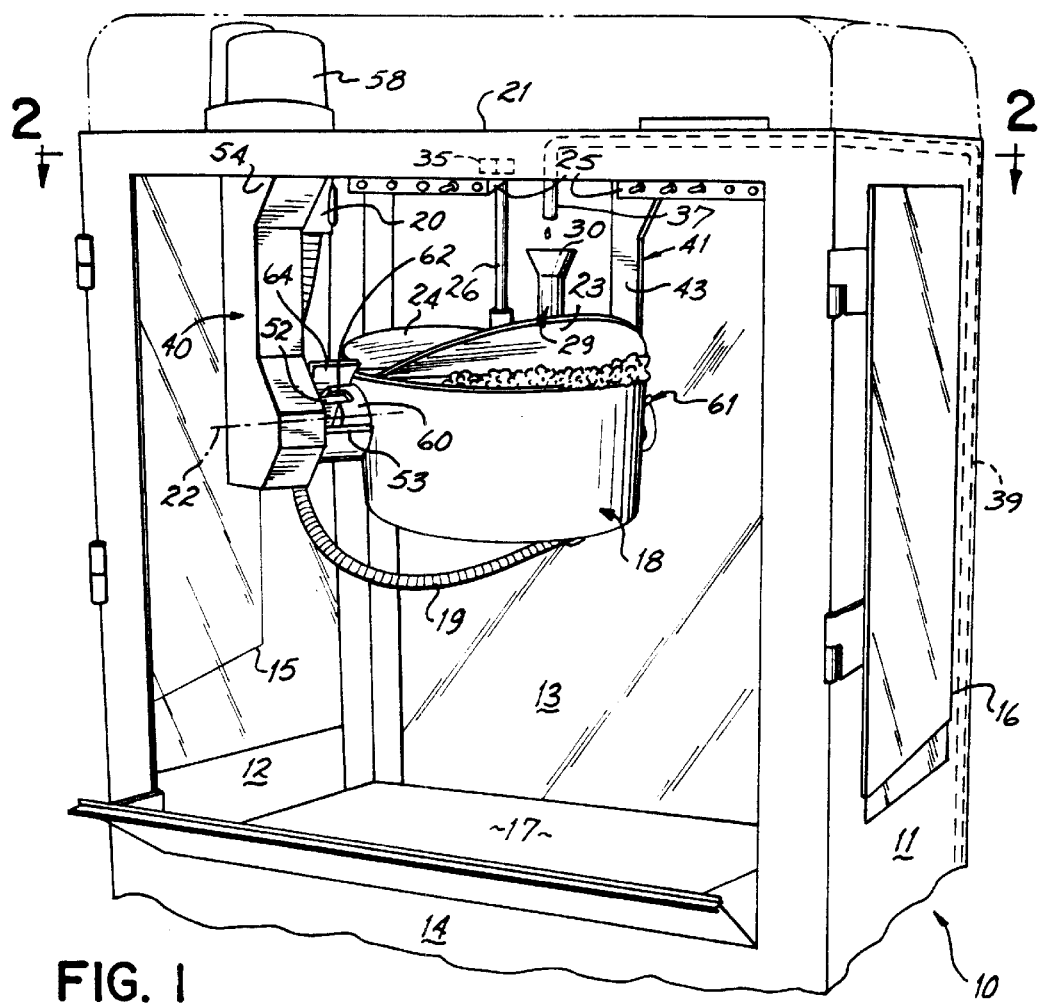
FIG. 1 is a perspective view of a popcorn popper apparatus in accordance with the principles of the invention.

Turning now to the drawings, there is shown in FIG. 1 an automated corn popper 10 according to the invention. It will be appreciated that the popper is operable to cook or to pop popcorn and is particularly useful for cooking consecutive batches of popcorn for sale for use by concessionaires at movie theaters, sport events, fairs and the like.

The corn popper 10 includes a cabinet having transparent walls including two sidewalls 11, 12, a rear wall 13, front wall 14, and a service platform 17 for catching popcorn. Front wall 14 includes two doors 15, 16, which can be opened to gain access, both to the popped corn on the platform 17 of the cabinet and to the kettle 18. Sidewalls 11, 12 and rear wall 13, as well as the front wall 14 including doors 15, 16, are all made preferably of transparent glass or plastic material so that the interior of the cabinet can be viewed from the exterior. The cabinet may also include various operating switches and light indicators on an operating panel 25 for turning ON kettle heat, the dump motor, a warmer (not shown) under platform 17 and lights inside the cabinet as well as turning ON the heaters and pumps of an oil pump system (see in FIG. 1B) for providing cooking oil for the operation. The lights may indicate that one or more of these systems are ON. Various of these systems will now be described in greater detail in accordance with the principles of the present invention.

The cabinet of popper 10 also preferably includes an oil pump system 36 which would rest below the platform in the cabinet (see FIG. 1B). The oil pump system 36 provides oil to the kettle during a cooking cycle and might be one of various different systems. For example, Gold Medal Products Co. of Cincinnati, Ohio, which is the owner/assignee of the present patent application, markets the Model 2114 Accumeter Bucket Pump for pumping popcorn oil. Another system, Model 2257 Rack Oil Delivery System, is also available from Gold Medal Products and is discussed in U.S. patent application Ser. No. 08/541,469 entitled "Oil Supply for Popcorn Poppers", which application is incorporated herein by reference in its entirety. While those oil systems manufactured by Gold Medal Products Co. are preferable, the present invention might be utilized with other systems as well.

Figure 2:
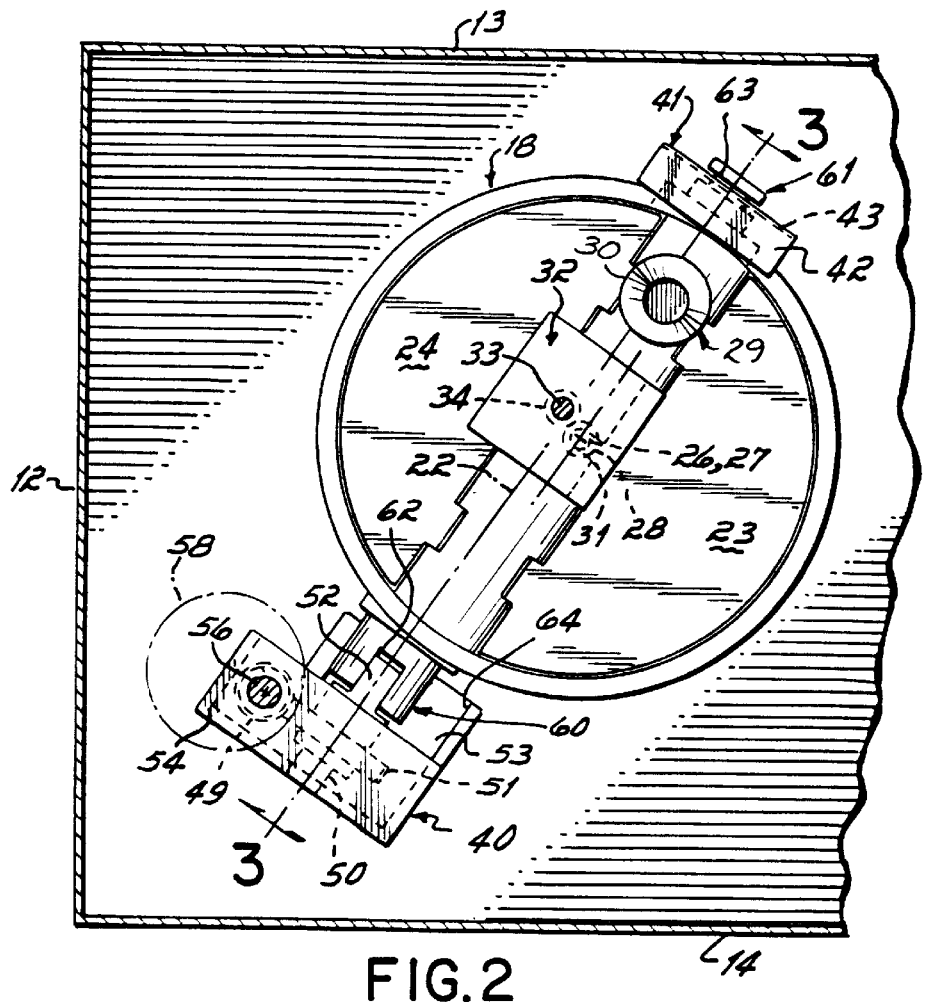
FIG. 2 is a cross-sectional view of a popcorn popping kettle as seen on line 2—2 of FIG. 1.

The popping kettle 18 is of any suitable variety having a heater (not shown in FIG. 1) interconnected by a control line 19 to a power plug 20 mounted inside on the top 21 of the cabinet. It will be appreciated that the kettle 18 is tiltable about a tilt axis 22 (FIG. 2) and is provided with covers 23 and 24 which are pivoted on the kettle 18. When the corn is popped, it pushes these covers open and falls out the sides of the kettle onto platform 17. Moreover, it will be appreciated that the cover 23 is located over a so-called "dump section" or side of the kettle 18. When the kettle is tilted, this cover pivots open to facilitate dumping of popcorn onto platform 17.

Positioned between covers 23, 24 is an oil funnel 29 which has a flared funnel mouth 30. When the kettle 18 is upright as shown in FIG. 1, the funnel 29 aligns with an oil outlet 37 which is coupled via a delivery tube 39 to oil pump system 36. Oil is pumped up by system 36 to drain into funnel tube 29 and kettle 18 for use during a cooking cycle as discussed in greater detail hereinbelow.

Figure 3:
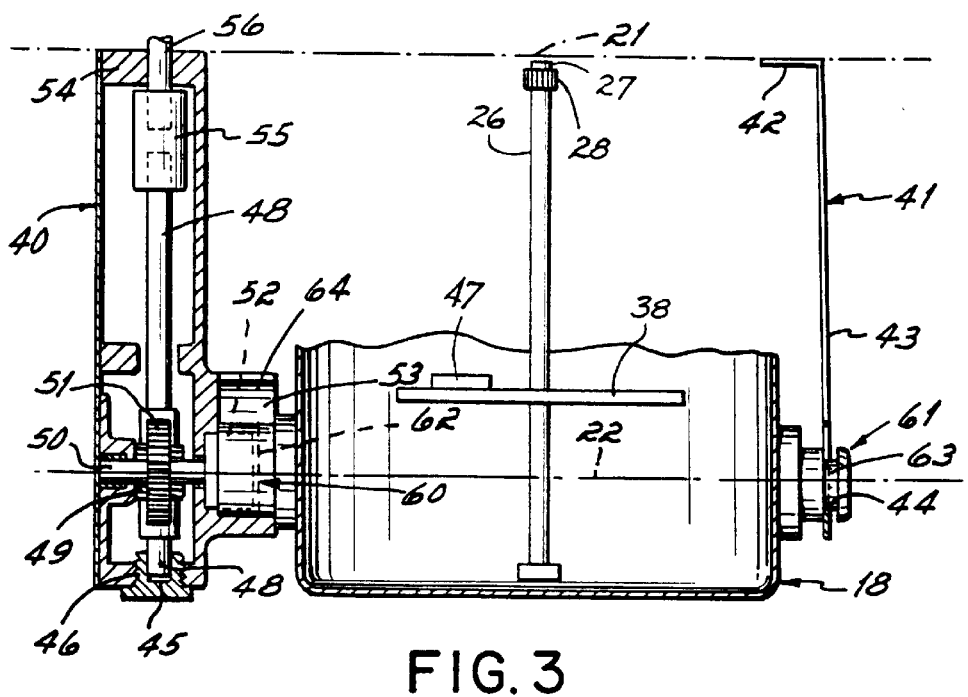
FIG. 3 is a cross-section taken along lines 3—3 of FIG. 2.
Figure 4:
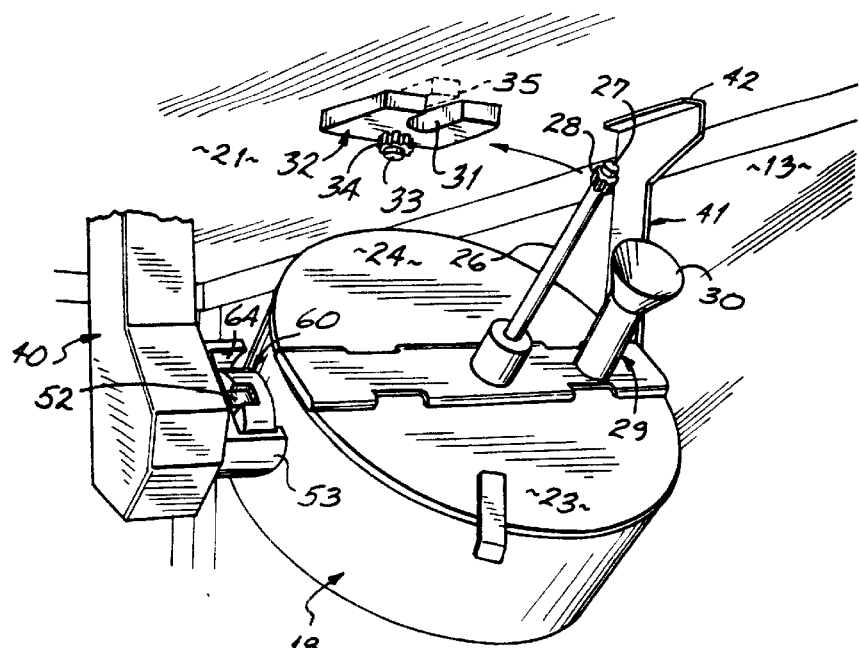
FIG. 4 is a perspective-view of the kettle of the popcorn popper of FIG. 1.

The kettle 18 includes an internal agitator, stir blade or rotor 38 (FIG. 3) driven by a rotor drive shaft 26 having an upper pilot end 27 and a driven gear 28 thereon. Referring to FIG. 4, when the kettle is in a cooking position as shown in FIG. 1, the upper pilot end 27 of the rotor drive shaft 26 is located in a socket 31 defined in a rotor drive housing 32 adjacent a drive shaft 33 and a drive gear 34. The drive gear 34 intermeshes with the driven gear 28 on the upper pilot end 27 of the rotor drive shaft 26 to drive the rotor within the kettle to promote popping. Directly above socket 31 in drive housing 32 is a position sensor 35 which determines that shaft 26 is seated in socket 31 and kettle 18 is in a cooking position. The sensor 35 promotes more accurate positioning of the kettle after it is tilted as discussed in greater detail below. The stir blade and shaft 26 are rotated by stir motor 68 which is activated by an appropriate operating switch on the panel 25 or by the controller of the invention as discussed below.

Referring again to FIG. 3, the blade 38 of the invention is weighted to prevent popcorn from being trapped against the blade during a dump cycle. As discussed further hereinbelow, the kettle 18 is tilted or dumped during a cycle to dump out the cooked popcorn. To prevent hindrance of the popcorn by blade 38, the blade is weighted on one side with an appropriate weight element 47 which causes the blade to rotate to a downward or generally vertical position during a kettle dump cycle. The blade 38 is then out of the way of the dumped popcorn so that popcorn falls freely from the kettle.

The kettle is mounted in the cabinet of the popper 10 by way of a drive housing 40 and a spring-like hanger bracket 41. The spring-like hanger bracket 41 includes an L-shaped bracket having a foot 42 for interconnection to the top 21 of the cabinet. The depending flat spring leg 43 is provided with an aperture or slot 44, as will be further described.

Figure 1A:
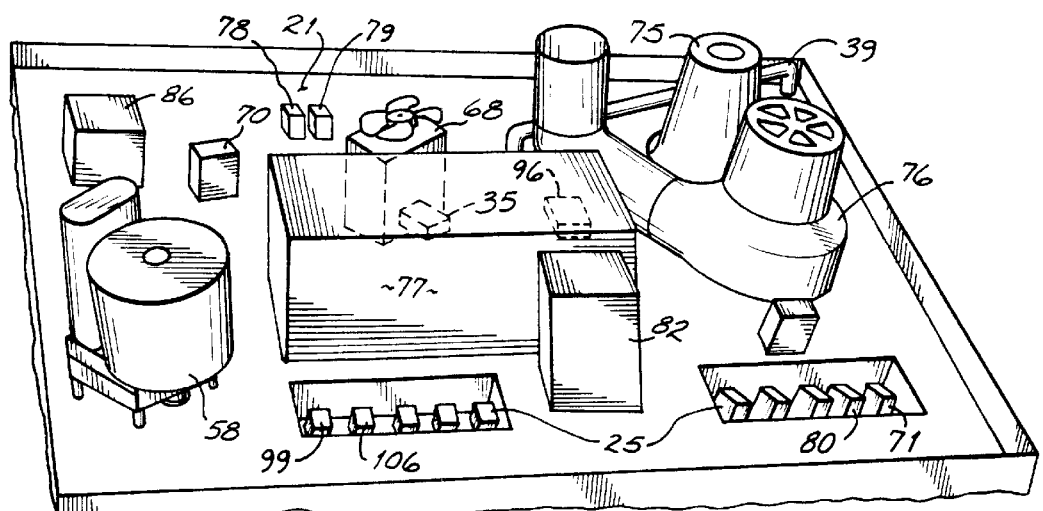
FIG. 1A is a perspective view of the top of the popcorn popper of FIG. 1.

On the other side of the kettle, the drive housing 40 houses the drive shaft 48, which is provided with a worm gear 49 on the bottom end thereof. A drive stub shaft 50 is provided with a gear 51 for intermeshing with the worm gear 49. The opposite end of the drive stub shaft 50 is provided with a drive stub 52 disposed in a socket 53 of the drive housing 40. The upper end of the drive housing 40 is provided with a mounting foot 54 for securing the drive housing 40 to the top 21 of the cabinet of the popper 10. In addition, it will be appreciated that the drive shaft 48 can be a one-piece drive shaft or it can be coupled through a coupling 55 to the depending drive shaft 56 of a dump motor 58 (FIGS. 1 and 1A). Drive shaft 48 is journaled in a blind bore 45 located in an externally threaded bushing 46 in the bottom of housing 40 (FIG. 3). This prevents lubricants from leaking into the popped pop corn.

The kettle 18 is provided with a drive boss 60 and a hanger boss 61. The drive boss 60 is provided with a slot 62 for receiving the drive stub 52, supported by the drive housing 40. The hanger boss 61 extends from the other side of the kettle with respect to the drive boss 60 and is provided with a groove 63 for receiving the depending leg 43 of the hanger bracket 41. In this regard, the groove 63 fits within a slot or aperture 44 of the hanger bracket 41 so that the kettle can be rotated about the pivot axis 22. At the other drive side of the kettle, the drive boss 60 resides in the socket 53, defined by the drive housing 40, so that the drive boss 60 can rotate in that socket. It will be appreciated that the socket has an opening 64 for accommodating radial movement of the drive boss 60 with respect to the socket and to the drive stub 52 when the drive stub 52 and the recess 62 in the drive boss 60 are aligned with the opening 64 to permit the drive boss to be moved outwardly of the socket.

Alternatively, the kettle could be supported in a cantilevered fashion only by the drive boss or other supporting apparatus as will be appreciated.

Turning now momentarily to FIG. 1A, there is shown a perspective view of the top of the popper 10 showing various components of the popper mounted outside the cabinet on the top 21 thereof including parts of the kettle operating system. The kettle operating system as it is termed herein includes the kettle heaters (not shown) and the kettle dump motor 58 as well as the control components which operate the popper in accordance with the principles of the invention.

As shown in FIG. 1A, the dump motor 58 is mounted on the top 21, such that drive shaft 56 extends downwardly through the top 21 and into the drive housing 40 (FIG. 3). A rotor drive motor or stir motor 68 is also positioned on the top 21 so that its drive shaft 33 extends downwardly through the top 21 and through the housing 32 for interconnection with the drive gear 34. A buzzer 70 is positioned preferably on the top 21 as shown, as well as a cabinet light 75, a ventilator 76 and various support circuitry for the components, including a Programmable Logic Controller (PLC) 77, a temperature controller 82, and a solid state relay 86 to the kettle heaters.

The control components for the control system of the invention comprise a Programmable Logic Controller, or PLC, such as a PLC made by Omron Electronics, Inc., One East Commerce Drive, Schaumburg, Ill. 60173, under the Model No. C20R. PLC 77 is connected to dump motor 58 through an UP relay 78 and a DOWN relay 79. The PLC is also connected to the audible buzzer 70 and to light 71 for audibly and visually notifying an operator when the kettle 18 is ready to receive another batch of popcorn, oil, salt and other ingredients. The visual indicator light 71, which may be positioned on control panel 25, flashes to visually alert an operator that the kettle is ready for another batch of ingredients simultaneous with the buzzing of buzzer 70. The visual indicator light 71 will provide a visual indication to an operator and is particularly helpful in the case of multiple machines in an area where it may be difficult to determine which one is buzzing. The PLC 77 provides output signals to the dump motor relays 78 and 79 to tilt the kettle and dump the popcorn cooked therein at the cessation of a cooking cycle. Output signals from the PLC 77 to the buzzer 70 and light 71 produce an audible signal and a visual signal which ensure consecutive batches of fresh popcorn without delays between batches as are normally associated with conventional popcorn machines.

The present invention is operable to monitor the temperature of the kettle to automatically alert the operator to load ingredients to automatically begin a cooking cycle when ingredients are loaded, and to end the cooking cycle and automatically initiate a dump cycle to empty the popcorn and again alert the operator to load more ingredients for the next batch. The invention monitors the kettle temperature and determines at certain temperature checkpoints which operations are to be automatically executed. Therefore, the popper of the invention may be loaded with corn and/or oil and then ignored until the next ingredients load to free the operator to handle other tasks. To that end, the control system of the invention further comprises a temperature controller 82 to control the heating of kettle 18 and to provide input signals to the PLC 77 for initiating a popcorn cooking cycle and subsequently for controlling dump motor 58 to dump finished popcorn from the kettle after a cooking cycle is complete. The temperature controller 82 has an output line 84 which is operably coupled to a solid state relay 86 connected to kettle heater 88. To provide a temperature input to the PLC, a thermocouple 90 is operatively connected to kettle 18 close to kettle heater 88 to monitor the temperature of the kettle. An output signal on line 92 from the thermocouple is input into the temperature controller 82. Through thermocouple 90 and line 92, the temperature controller 82 monitors the temperature of kettle 18 and turns power to the heater 88 ON and OFF through solid state relay 86 to maintain the temperature at a predetermined start temperature or equilibrium temperature. Preferably, the start temperature is approximately 500° F. to 525° F., although it will be appreciated by one of ordinary skill in the art that such a temperature might be varied up or down for a particular size kettle or other variable cooking conditions.

The temperature controller 82 communicates on line 94 directly with the PLC 77. Line 94 is a low temperature alarm line which is utilized to set the beginning of the cooking cycle and to initiate a kettle dump at the end of the cooking cycle. As described further hereinbelow, temperature controller 82 sends an input signal on line 94 to the PLC 77 when thermocouple 90 indicates that the kettle temperature has dropped below a predetermined temperature or low alarm temperature, such as when uncooked popcorn kernels and oil are poured into the kettle 18, and through thermal loading, cause a rapid decrease in the kettle temperature. The falling temperature passing through the low alarm temperature point 149 indicates that a cooking cycle has been started (See FIG. 8). As may be appreciated, as the popcorn in kettle 18 cooks, the thermal load is reduced and the temperature of kettle 18 begins to rise again. The kettle temperature will again pass through the low alarm 150 temperature point, except this time as a rising temperature rather than a falling temperature, the rising temperature passing through the alarm point indicates the end of the cooking cycle (See FIG. 8). At such a time, a signal is sent on line 94 to the PLC 77 to initiate a kettle dump procedure to dump the cooked popcorn onto service platform 17 as discussed below. While the low alarm temperature may be variably adjusted in temperature controller 82, it is preferably set to be approximately 50° F. to 75° F. below the start temperature referenced above, e.g., it may be set to be approximately around 425°–500° F., depending upon the preferred start temperature. The temperature point indicating the temperature 149 as it first falls through the low alarm temperature when uncooked popcorn is added to the kettle is designated the cycle temperature or cycle point as it indicates to the PLC the beginning of an official cooking cycle. A cooking cycle is not begun until the kettle drops below the cycle temperature 149 to prevent false cycles which might occur as the empty kettle fluctuates around the start temperature (see FIG. 8). That is, the substantial drop from the start temperature will indicate that corn and oil have been added to the kettle. The subsequent point 150 wherein the temperature increases back up to the low alarm temperature after the popcorn is cooked and popped is considered the dump point or dump temperature because the PLC initiates a kettle tilt to dump the popcorn at that temperature. Preferably, the cycle temperature 149 and 150 and dump temperature are approximately the same (see FIG. 8), e.g., approximately 475° F. However, it may be appreciated that the temperatures might also be offset from each other. Both the cycle temperature and dump temperature are below the start temperature point.

In order to ensure stable heating of kettle 18, the temperature controller 82 will preferably cycle solid state relay 86 and heater 88 ON and OFF numerous times as the kettle temperature closely approaches the equilibrium start temperature. This reduces substantial conditions beyond levels 142 and 152 of the kettle temperature which might occur should the heater be turned OFF only at the time that the kettle reaches the start temperature due to thermal transients in the system. A suitable temperature controller for use with the invention is the Model 935 Proportional Integral Derivative or PID, programmable temperature controller available from Watlow, 1241 Bundy Blvd., P.O. Box 5580, Winona, Minn. 55987-5580. The Model 935 temperature controller 82 is capable of monitoring when the kettle temperature is getting close to the equilibrium start temperature and operably slowing down the heating process as that start temperature is approached. The Model 935 temperature controller also has an alarm silence feature which prevents kettle dumping when the kettle is heating up-upon initial powerup. For example, as discussed above, temperature controller 82 monitors a rising temperature which reaches the predetermined low alarm temperature in order to indicate the end of a cooking cycle and to control the dump motor 58 to dump the kettle. As may be appreciated, a rising temperature passing through the low alarm temperature is a scenario which will occur upon initial powerup as the kettle heats from a cold state to an equilibrium start temperature. In order to prevent a kettle dump at initial powerup, temperature controller 82 has a start override feature to ignore the first rising pass 151 through the predetermined low alarm temperature (See FIG. 8).

As the temperature controller 82 monitors the kettle temperature, it controls the operation of the heater 88 through solid state relay 86. The present invention alerts an operator when the kettle is ready to cook, and to indicate to the PLC 77 when kettle temperature has reached the equilibrium start temperature, a slave relay 96 is coupled to the output of relay 86 and provides an input to the PLC 77 on line 93. When the solid state relay 86 is closed to provide power to the heaters 88 to heat kettle 18, a 24V signal is delivered to PLC 77 through slave relay 96. When the solid state relay 86 closes and turns power to heater 88 OFF and remains OFF, indicating that the kettle has reached start temperature, (e.g., 525° F.) the slave relay 96 stops the signal to the PLC 77 and the PLC, in response, provides an output to buzzer 70 and light 71 to produce an audible and visual indication and alert the operator that the kettle is ready to cook popcorn. With consecutive batches of popcorn, buzzer 70 and light 71 will again be energized to provide an audible and visual indication indicating that the popcorn has been cooked and dumped and the kettle is ready for another batch of popcorn kernels. In that way, consecutive batches are made without delay.

The PLC 77 is also coupled to the kettle heat switch 80 to monitor when the kettle heat to popcorn popper 10 is turned ON and OFF. When power to the kettle heater 88 is turned OFF, the PLC 77 will internally reset a status bit. Thus, the PLC is not fooled into initiating a kettle dump when the power is turned OFF and then ON again, and in that way, the PLC 77 further prevents inadvertent dumping. For example, when the power and the heat to the kettle are turned ON by turning on switch 80 to deliver power to relay 86, the PLC 77 monitors the kettle temperature through temperature controller 82. If the heat 80 is then turned OFF, kettle temperature would drop, simulating thermal loading of the kettle with fresh popcorn and oil when indeed no popcorn or oil is loaded. If the kettle heat is then again turned ON, the PLC 77 may note the rising temperature passing through the low alarm temperature point and thus may believe that a batch of popcorn has been cooked and that it is time to dump the kettle. By resetting the PLC 77 status bit upon an interruption of power to the heater 88, such a scenario is avoided. A high limit switch 98 is coupled to the kettle heater 88 to cut off the power to the heater if the kettle temperature exceeds a set upper limit, such as if the solid state relay 86 stays open or the temperature controller malfunctions.

The stir motor 68 turns a blade (not shown) during the cooking of the popcorn. In one version of the invention, stir motor 68 is turned on by a switch at the operating panel 25 and stays on. Alternatively, power to the stir motor is routed through PLC 77 and is controlled by PLC 77 as noted by line 73. PLC 77 operates the stir motor 68 so that the blade stirs automatically only during a cooking cycle and stops when the cooling cycle is complete independent of operator attention.

The oil for cooking the popcorn may be delivered either by hand, by the operator actuating a switch on the operating panel 25 which is coupled to pump system 36, or alternatively may be handled automatically through PLC 77 to automatically deliver oil at the initiation of a cooking cycle. Oil pump system 36 preferably includes a reservoir 101, a control housing 103, and a pump 104 to pump oil from the reservoir. The pump system 36 will also usually include a heater (not shown) for heating congealed oil to a liquid state before pumping. The heater may be operably coupled to the control panel so that the oil may be properly heated for being pumped to kettle 18.

In one embodiment of the invention, the oil pump 104 is operably coupled to an oil pump switch 106 which is located at the operating panel 25. When the kettle heat switch 80 is ON and the kettle heats to the start temperature, oil will be needed for a cooking cycle. In accordance with the principles of the invention, oil pump switch 106 will be effectively disabled until all conditions are proper for a cooking cycle. Switch 106 is operably coupled to PLC 77 as indicated by line 111 and the PLC 77 is operably coupled to oil pump 104 as indicated by line 113. PLC 77 disables switch 106 until the kettle heat switch 80 is ON, as indicated by control line 115 between switch 80 and PLC 77, until kettle 18 is upright, as indicated by proximity switch 35 coupled to PLC 77, and until kettle 18 is properly heated as indicated by the thermocouple 90 and controller 82. This prevents oil from being pumped to funnel 29 from reservoir 101 until the kettle is hot and in the proper position.

Upon enablement of the oil pump switch 106, the operator may engage the switch to deliver a premeasured amount of oil from reservoir 101. Generally, pump 104 will be controlled by a timer 129 (see FIG. 6) which may be adjusted by a mechanically adjusted dial 117. In that way, the pump 104 will pump oil to kettle 18 for a predetermined amount of time to deliver the proper premeasured amount of oil. When the timer 129 times out, the pump 104 stops. Upon delivery of the oil, PLC 77 will disable switch 106 so that no more oil may be added until the next cooking cycle. In that way excess, uncooked oil is generally not present in the kettle, thus preventing any spills or messes. Pump 104 is coupled to line 39 for oil delivery.

Figure 1B:
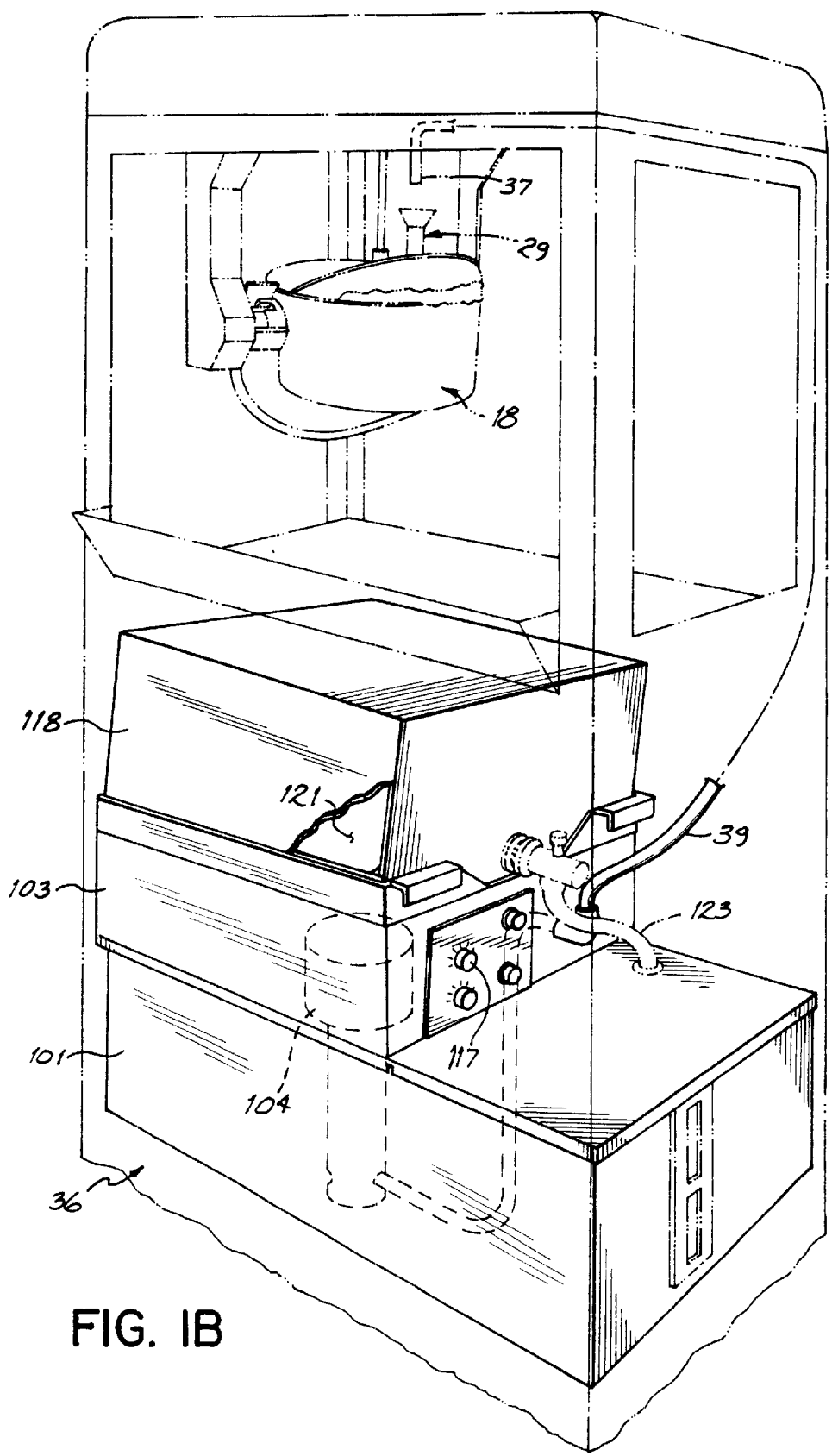
FIG. 1B is perspective view of the popcorn popper of FIG. 1 illustrating the oil pump system.

FIG. 1B illustrates the oil pumping system which is the subject of U.S. patent application Ser. No. 08/541,469 and greater detail about the operation of the system is given therein. Pump system 36 is usually referred to as a bag-in-box system and includes a container 118 on top of control housing 103 which holds a flexible bag of oil 121. An oil tube 123 connects bag 121 and reservoir 101. Alternatively, an-oil bucket or pail system, such as the Model 2114 Accumeter Bucket Pump (not shown) may be used.

In an alternative embodiment of the invention, the PLC 77 is operably coupled to pump 104 and timer 129 by control lines 131, so that delivery of oil is automatic. When the kettle 18 heats up, and is in the proper upright position as discussed hereinabove, the PLC 77 will automatically actuate pump 104, instead of enabling switch 106 and requiring the operator to actuate the switch 106. Therefore, oil is delivered automatically at the beginning of a cooking cycle. The operator then only has to add popcorn kernels, as the cooking cycle begins. Timer 129 will control how long pump 104 runs once it is actuated to deliver the proper amount of oil. Timer 129 may be a programmable timer which is set by the PLC 77 control lines 131 and may be programmed for certain, preselected amounts of oil for a batch. That is, the PLC 77 controls the timer 129 as opposed to a mechanical mechanism such as dial 117. Once the timer 129 times out, pump 104 stops and will not be reactuated until the next cooking cycle. As with the previous scenario, if the kettle heat switch 80 is OFF, no oil is added to the kettle.

It will be understood that various combinations of oil loading steps might be utilized in accordance with the principles of the invention. For example, the oil pump 104 may require switch actuation while the timer 129 is automatically programmed by PLC 77. In another version, the pump 104 may be automatically actuated by PLC 77 while timer 129 is manually set by a dial 117 or other mechanical device. The oil system 36 will generally include a preheater (not shown) for liquefying the oil prior to pumping. The preheater may be actuated at the control panel 25 or directly at the control housing 103 of oil system 36.

As the popcorn and oil are cooked during the cooking cycle and the kettle temperature begins to rise, it rises through the low alarm temperature 150 point or dump point as discussed above. A kettle temperature rise through the low alarm point or dump point which was preceded by a cycle point indicates the end of a cooking cycle and the invention is then operable to initiate a dump cycle. At the initiation of the dump cycle, the PLC 77 actuates the DOWN relay 79 to direct the dump motor 58 to rotate the kettle downwardly and thus dump the contents. The down relay is actuated for a predetermined period of time and then the relay is deactuated. Assuming that the cooking position of the kettle as illustrated in FIG. 1 is 0°, the kettle is rotated approximately 180° for the first dump to dump the popcorn contents therefrom. That is, the kettle is turned upside down. Subsequently, the PLC 77 actuates the UP relay 78 to energize dump motor 58 and move the kettle 18 toward the cooking position. However, the UP relay is only actuated to return the kettle partially to its cooking position and in fact is preferably energized for a time period sufficient to move the kettle to an approximately 60° angle between the 0° cooking position and the dump 180° position. This partial return is obvious to the operator and prevents him from believing the kettle is in the cooking position. Therefore, the operator is not misled into prematurely loading popcorn and oil into the kettle.

After the partial return toward the cooking position, the DOWN relay 79 is again actuated to make the dump motor 58 rotate the kettle downwardly to 180° to again dump the popcorn contents. The two-stage dump cycle of the present invention provides proper and complete dumping of all the contents from kettle 18 so that little or no popcorn remains in the kettle to be burned during the next cooking cycle. After the second dump, the UP relay 78 is actuated to energize dump motor 58 to return the kettle to the upright cooking position. Thus, the kettle 18 is rotated to a full dump position, partially returned, rotated to a full dump position again, and then fully returned to the cooking position for another cooking cycle.

Referring again to FIG. 4, when kettle 18 is returned to the cooking position, the upper pilot end 27 of drive shaft 26 engages socket 31, and in doing so will actuate the proximity switch 35. Proximity switch 35 is preferably a metal detecting proximity switch which indicates the presence of the shaft end 27. Upon sensing the shaft end 27, the proximity switch 35 provides an input to PLC 77 which then simultaneously actuates both the UP and DOWN relays 78, 79 to lock the dump motor 58 and provide a secure stop when the kettle is returned to the cooking cycle. Proximity switch 35 provides secure placement of the kettle in the cooking position and allows rapid return of the kettle to that position without slowing the motor down as the kettle approaches. The present invention thereby prevents overshoot of the shaft end 27 and socket 31 and also ensures that the gears 28 and 34 are properly seated for the next cooking cycle. The proximity switch also ensures that oil can be added to the kettle 18 only when the kettle is upright.

Upon the return of the kettle 18 to the cooking position with the kettle heated back up to the start position, PLC 77 again actuates buzzer 70 to provide an audible indication to the operator that another batch of ingredients should be added to the kettle. In that way, consecutive batches of popcorn are made with very little delay between the batches. Thus, the productivity of the operator and the popper 10 and the profitability of the entire operation, is increased. PLC 77 operates to actuate buzzer 70 at ten second intervals until new ingredients are loaded into the kettle 18. In that way, the operator cannot ignore the popper 10 of the invention as it will continue to alert him until another batch of ingredients is loaded. If the buzzer is ignored for ten minutes, it will begin to sound continuously.

Figure 5:
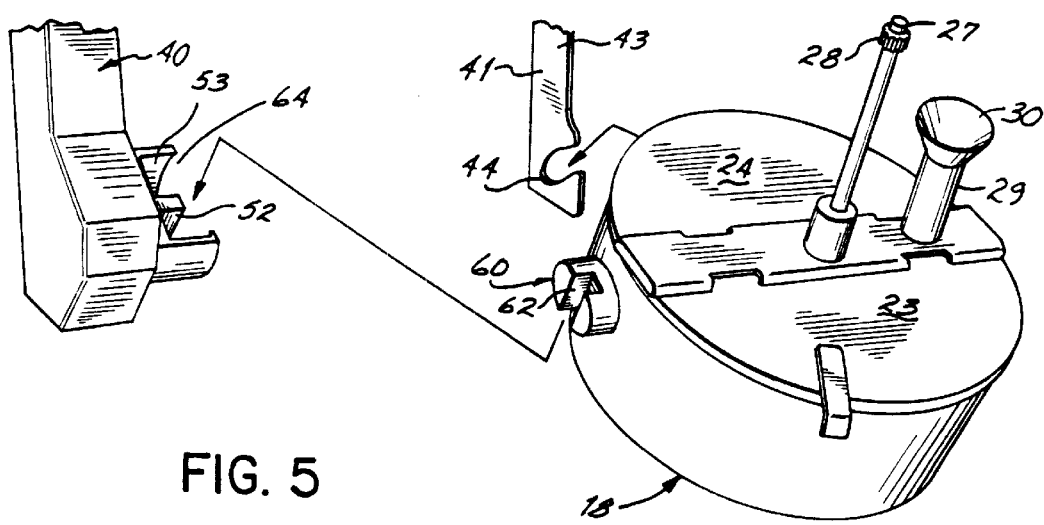
FIG. 5 is a perspective view of the kettle of FIG. 4 removed from its housing for cleaning.

Kettle 18 may also be removed and cleaned as described in the parent application entitled AUTOMATED CORN POPPER referenced above. To that end, the PLC 77 is operably coupled to a clean switch 99. When the clean switch is actuated, PLC 77 is operable to actuate the DOWN relay 79 and dump motor 58 to tilt the kettle 18 to a position between the cooking position and the full dumping position. In this intermediate position, the plane of the drive stub 52 is aligned with the opening 64 and the socket 53, thereby permitting the drive bar 60 of the kettle to be lifted out of the socket, cleaned, and then subsequently replaced for further popcorn cooking as illustrated in FIG. 5.

Figure 6:
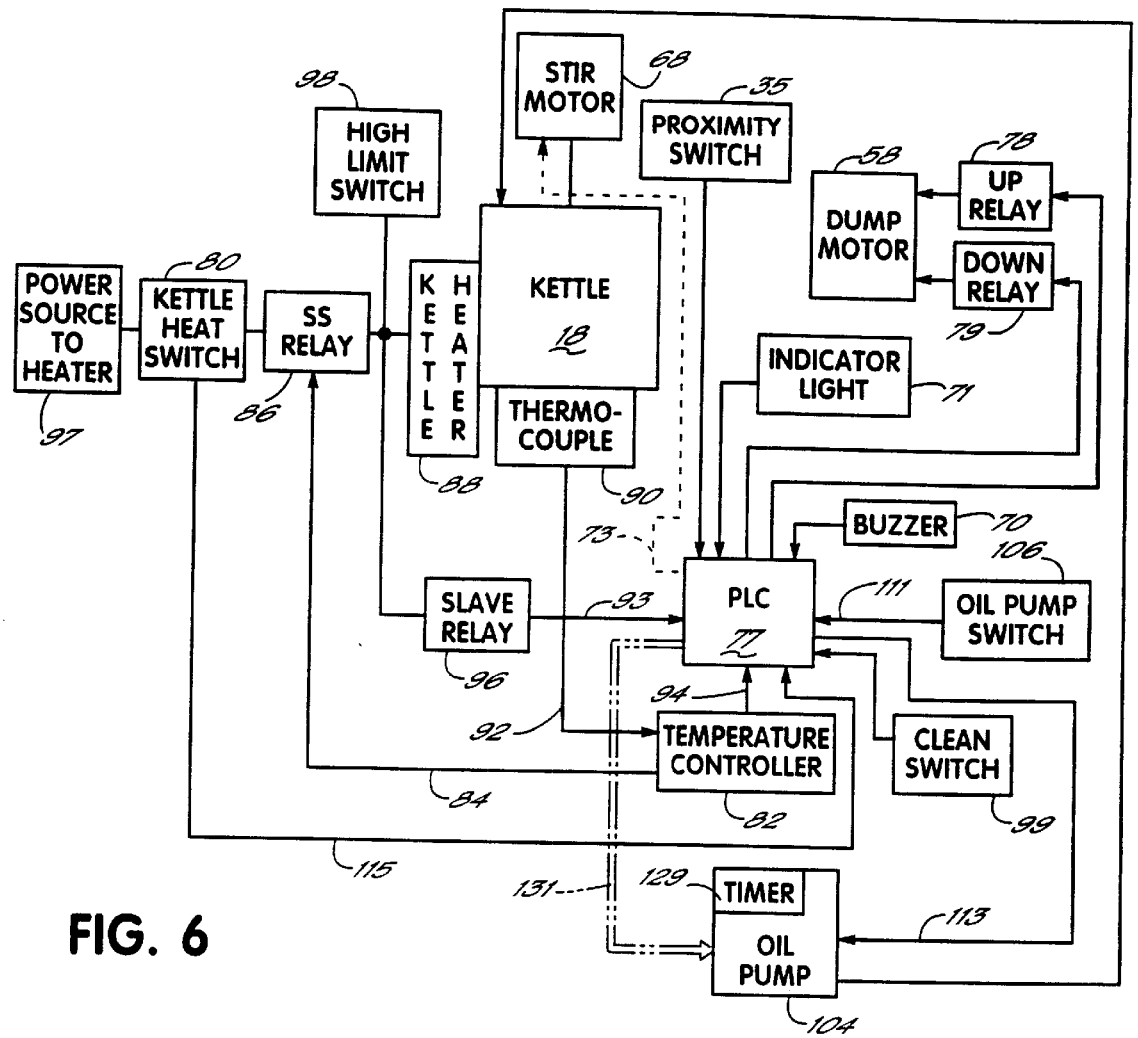
FIG. 6 is a diagrammatic view of the electrical components of the popcorn popper of FIG. 1.

Further understanding of the present invention may be obtained by a discussion of the operation of the invention and particularly to operation of PLC 77. An operational flowchart is illustrated in FIG. 6.

Prior to beginning a cooking cycle or in order to clean the kettle, the heat switch 80 should be OFF (block 95). The PLC 77 then checks to see if the kettle is cool (block 100). If the kettle is cool, the clean switch 99 is enabled by the PLC 77 (block 102). The clean switch may then be actuated to tilt the kettle 18 for cleaning. The kettle is then cleaned and returned to the upright position (block 127). As will be recognized, the kettle does not always have to be cleaned, and an operator may proceed directly to a cooking cycle wherein the process begins at block 105.

Figure 7:
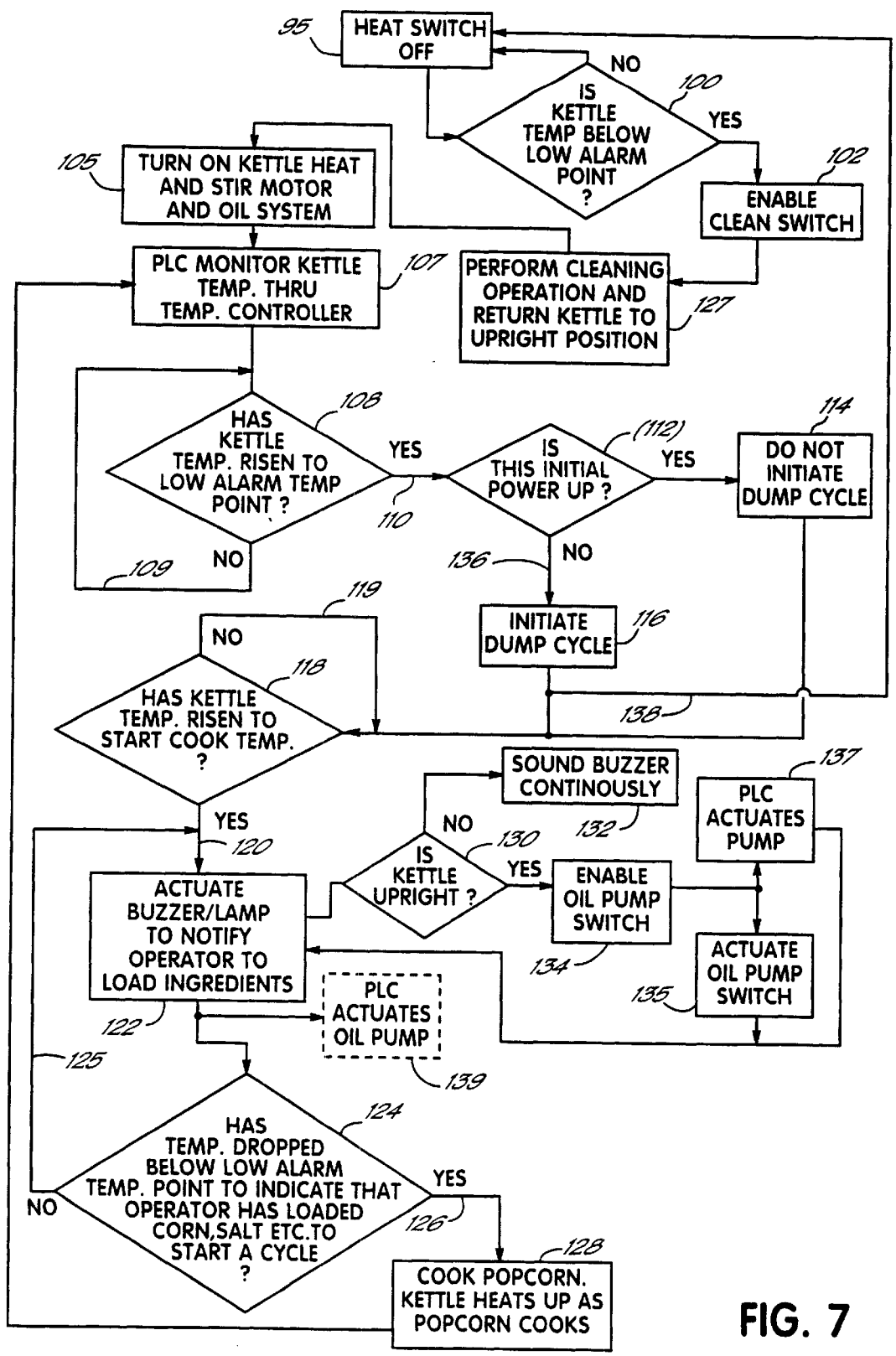
FIG. 7 is an operation flowchart of the popcorn popper apparatus of the invention.

To begin a popping operation, the operator turns on the various systems of the popper. For example, the operator would turn ON the heat switch 80 to the kettle heater 88 to deliver power to kettle heater 88 through the relay 86. If necessary, the kettle stir motor 68 would be turned ON at panel 25 or may automatically be controlled by the PLC 77. The oil pump system 36 and any components, such as an oil preheater, might also be turned ON as indicated by block 105. When the kettle heat switch is ON, the PLC 77 monitors the kettle temperature through temperature controller 82 as indicated at block 107 in FIG. 7. As the PLC 77 monitors the temperature, it continuously checks to determine if the kettle temperature has risen to the low alarm temperature point which may indicate either that the kettle is initially heating up or is returning to its equilibrium start temperature after having cooked a batch of popcorn (see block 108). As indicated by line 109, the PLC 77 will continue to monitor the kettle temperature until it has risen to the low alarm temperature point. When it has reached the low alarm point, as indicated by line 110, the PLC 77 determines whether the system is initially being powered up and has not yet cooked the first batch of popcorn (see block 112). As discussed hereinabove, the temperature controller has a start override feature which ignores the first rising temperature pass through the low alarm temperature which indicates that the system is initially being powered up. By ignoring the first low alarm temperature point, the dump cycle is not initiated as indicated by block 114. Otherwise, when the rising temperature returns to and passes through the low alarm temperature point, a dump cycle would normally be initiated according to block 116 because a low alarm temperature point preceded by another low alarm point (cycle point) will indicate the end of a cooking cycle and a dump point as described above.

As the PLC 77 and temperature controller monitor the kettle temperature, the PLC 77 checks to see if the kettle temperature has risen to the equilibrium start temperature which is preferably approximately 500° F. to 525° F., as indicated by block 118. If the kettle temperature has not reached the start temperature, the PLC 77 continues to monitor the kettle until that temperature is reached according to line 119. When the equilibrium start temperature has been reached, the system indicates that the kettle is ready to be loaded with ingredients to cook a batch of popcorn (line 120). At the start temperature, a buzzer is sounded and a light flashed intermittently by the PLC 77 to notify the operator that it is time to load popcorn ingredients and to start cooking according to block 122. The buzzer will sound intermittently at ten second intervals and will continue to sound for ten minutes. If the operator ignores the buzzer for ten minutes, and no ingredients have been loaded, the buzzer will then sound continuously.

When the kettle is ready to cook, the PLC 77 checks to see if the kettle is upright (block 130). If not, the buzzer sounds continuously (block 132). If the kettle is upright, the oil pump switch 106 is enabled (block 134). At this point, the oil pump switch 106 may be manually actuated to add a premeasured amount of oil to the kettle as described above (block 135). After oil is added, the switch 106 will be disabled as discussed above, so that no more oil may be added until the next cooking cycle. Alternatively, the PLC 77 may automatically actuate the oil pump system (block 137) as described above. At that point, popcorn is also added to initiate a cooking cycle. As may be appreciated, the automatic pumping of oil may be prevented until after the popcorn is loaded and a cooking cycle is initiated, as shown by block 139. In that way, oil introduction is not premature, such as when the kettle heat switch is turned OFF while the buzzer is sounding and light flashing to clean the kettle as discussed above. For example, oil might not be automatically added until after the temperature of the kettle full of popcorn drops, indicating the initiation of a cooking cycle.

The PLC 77 then monitors the kettle temperature in order to determine if the ingredients have been loaded. As discussed above, the uncooked ingredients such as corn and oil will act as a heat load and reduce the kettle temperature when they have been placed therein. As noted in block 124, the PLC 77 will continue to monitor the kettle temperature and if no ingredients have been loaded, i.e., kettle temperature has not dropped (line 125), the buzzer will continue to sound. If ingredients are loaded, the kettle temperature will drop somewhat rapidly and will plunge below the low alarm temperature point (cycle point) 149 of the temperature controller (see FIG. 8). The buzzer then stops buzzing and the light stops flashing. Popcorn is then cooked by the kettle (block 128).

As the buzzer 70 is sounding and light flashing 71, the operator has the alternative options of turning the machine off or loading ingredients. If the kettle heat switch 80 is turned OFF, the system operation essentially returns to block 95 to determine if it is safe to clean the kettle.

Returning now to block 128, as the popcorn is cooked, the kettle begins to again heat up and the temperature controller 82 and the PLC 77 continue monitoring the kettle temperature to determine if it has recovered or risen back up to the low alarm temperature point (dump point) 150 and proceeded through that point on its way back to an equilibrium start temperature (block 108). If the kettle temperature has risen to the dump point and it is not an initial power-up situation, as indicated by line 136, a dump cycle will be initiated as described hereinabove (block 116). After the dump cycle is initiated, the system either returns to block 95 if the kettle heat switch is turned OFF to clean the kettle (line 138) or will continue to heat the kettle up to its equilibrium start temperature and will be ready for the next load of ingredients to cook the next batch of popcorn. As illustrated by block 118 when the start temperature has again been reached, the buzzer will again sound to notify the operator to load ingredients. Also, the oil pump switch will be enabled (block 134), after having been disabled after oil was added for the previous batch.

In that way, the automated corn popper 10 of the present invention only has to be loaded with ingredients to continually produce successive batches of popcorn. Once the ingredients are loaded, the operator can ignore the popper and the corn will be properly cooked and dumped to be ready for serving. An audible buzzer 70 and flashing light 71 will constantly remind the operator when a new ingredients load is need and a cooperative working relationship between the operator and the popper is developed for producing consecutive batches of fresh popcorn efficiently and safely while leaving the operator to more important tasks such as selling the product. Furthermore, the temperature control of the popper ensures that the right amount of heat is applied to each batch of popcorn for consistently cooked popcorn. Still further, the invention controls an oil pump system to ensure that the proper amount of oil is added without excess.

Figure 8:
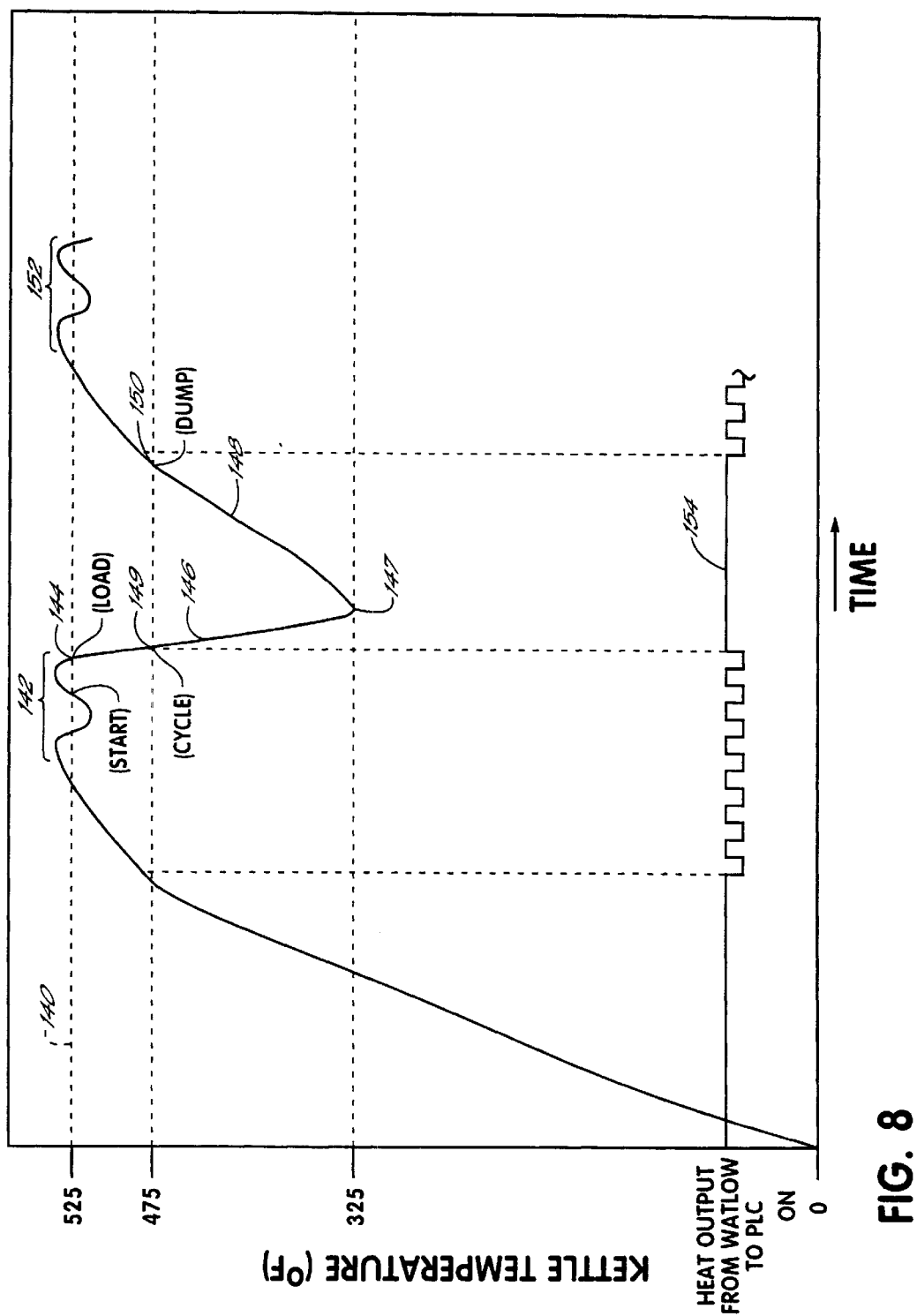
FIG. 8 is a temperature graph versus time of the kettle during a popcorn cooking cycle.

FIG. 8 schematically illustrates the kettle temperature as a function of time through initial power-up and a single cooking cycle. When the kettle heat is turned on, the kettle 18 heats up steadily until it reaches an equilibrium start temperature as indicated by line 140. Preferably, an equilibrium start temperature will be around 500° F. to 525° F., but may be adjusted accordingly, depending upon the popcorn load and the size of the kettle and other heating factors as understood by a person of ordinary skill in the art. The temperature controller 82 of the invention is programmed with the equilibrium start temperature and will automatically monitor the kettle temperature to determine when it begins to approach the start point 144. The temperature controller 82 will cycle the heater 88 accordingly to prevent a large amount of overshoot as indicated by the decreasing slope of the curve as it approaches line 140. When the start temperature is reached, the kettle heater 88 is cycled ON and OFF by relay 86 to maintain the kettle close to the start temperature as indicated in the curve section designated by reference numeral 142. When ingredients, such as kernels and oil, are loaded, as indicated by the load point 144, the kettle temperature drops off somewhat rapidly as indicated on the curve by reference numeral 146. Depending upon the popcorn and oil load, the kettle temperature would drop to a low point 147, for example in FIG. 8, indicated around 325° F. As the kettle temperature drops, it will drop through a low alarm point 149. This first low alarm point is designated the cycle point or cycle temperature, because the PLC 77 sees it as the beginning of a cooking cycle.

As the popcorn cooks, the kettle temperature again begins to rise as indicated by reference numeral 148 and will again pass through the low alarm set point or dump point 150. At dump point 150, the end of the cooking cycle is indicated, and the PLC 77 responds by initiating a dump cycle. Therefore, the cooking cycle is defined between the cycle point 149 and the dump point 150, although some cooking of the popcorn will occur before the cycle point 149 and after the dump point 150.

The dump cycle is a two-stage dump and empties the cooked popcorn onto the serving platform to be sold. After the dumping cycle, the kettle temperature again rises to the equilibrium start temperature of 525° F. and the heater will again be cycled ON and OFF to keep the kettle at that temperature indicated on the curve by reference numeral 152. At the start temperature, the buzzer 70 will again sound and the light 71 will flash to indicate to the operator that a batch of popcorn has just finished cooking and that a new load of ingredients should be added to the kettle.

Line 154 illustrates the signal on line 94 from temperature controller 82 to the PLC 77. When the low alarm temperature points are reached and exceeded (either cycle point or dump point) the output from the temperature control cycles oscillates from high to low at an internal frequency. The square wave signal is used preferably to drive the intermittent buzzer 70 and flashing light 71. When the temperature of the kettle drops below the low alarm temperature point, the output of temperature controller 82 stays high, which indicates that a cooking cycle is ongoing.

As described, the present invention continuously and properly cooks popcorn in consecutive batches with minimal attention by the operator. Because the kettle is controlled by temperature and the dump cycle is initiated automatically depending upon the kettle temperature, the popcorn is not burned and is not affected by operator inattention. Furthermore, the introduction of oil is controlled for a proper, premeasured amount only once during each cooking cycle. Messes and spills associated with the prior art devices are reduced, and a reduction in the delays between fresh batches of popcorn will increase the production rate of the popper and thereby increase sales and profitability of the popper. Furthermore, the present invention insures that a consistent and proper amount of heat energy is always applied to the corn for popping. The invention is not particularly susceptible to environment variations, and will ensure that the proper amount of heat energy is applied to a batch of corn. Larger batches will get more heat energy and small batches will get less heat energy to insure consistent popping.

Turning now to other aspects and embodiments of the invention, it will be appreciated that the foregoing detailed specification is particularly applicable to automatic systems wherein the kettle is loaded and dumped automatically. Further alternative embodiments contemplate popping apparatus and methods wherein the kettle may be automatically or manually loaded and automatically or manually dumped.

For example, in one aspect of an alternative embodiment, audible and/or visual alarms are controlled by the controller to produce an alarm when the kettle reaches the dumping temperature or Tdump temperature and the popcorn is finished cooking. This alerts an operator to observe the kettle dumping or, in a manual mode, to actuate the control to manually dump it.

An alarm is also given to alert the operator that the kettle is being loaded when it has reached a loading temperature, or Tload temperature, or to actuate the control to load corn and oil when Tload is reached, or to load the kettle manually when Tload is reached. In one embodiment of the invention, the dump temperature and load temperature are approximately the same, and an operator will dump one batch and load a new batch of ingredients at approximately the same time.

Figure 14:
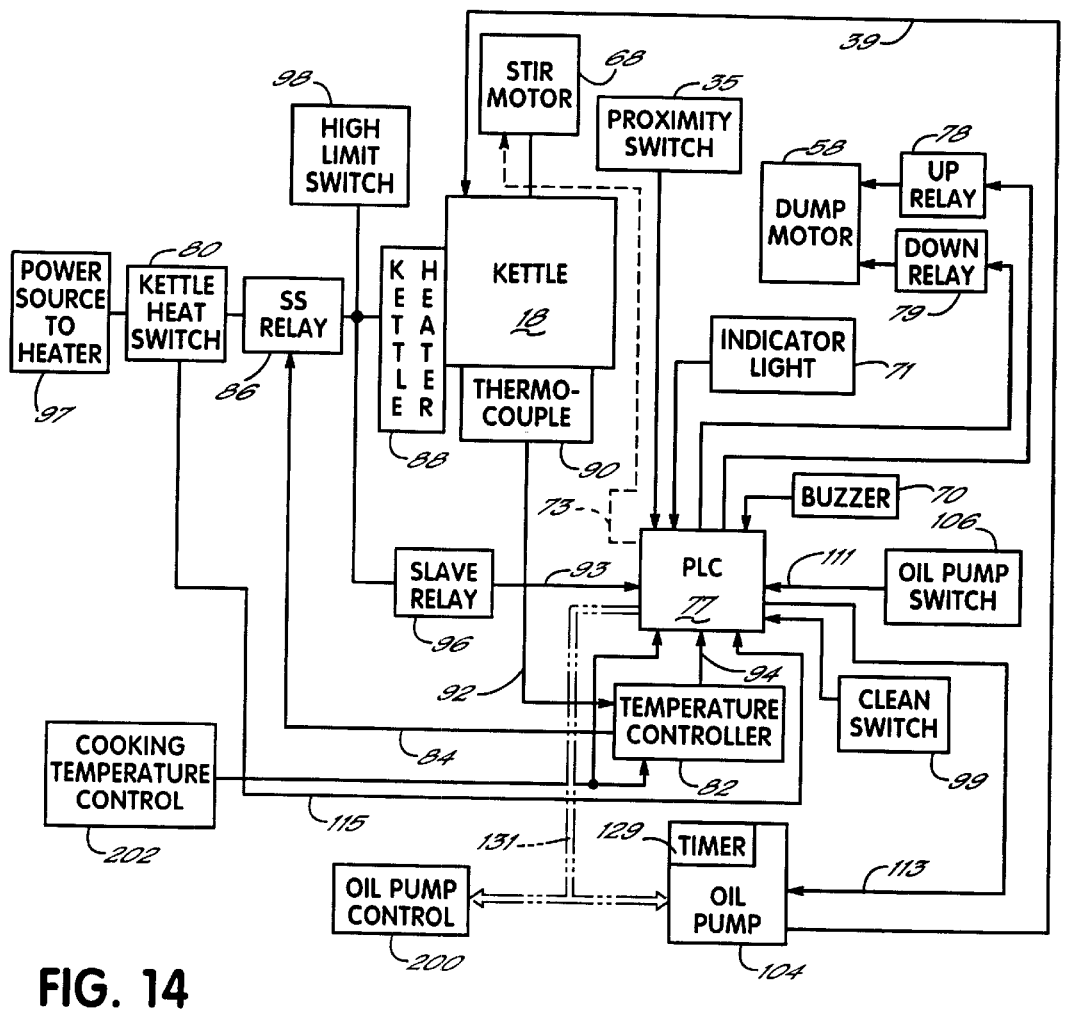
FIG. 14 is a diagrammatic view of the electrical components of a popcorn popper similar to FIG. 6 but according to an alternate embodiment of the invention.

Specifically, and referring to FIG. 14, the PLC 77 or other controller, such as a microprocessor, is coupled to an audible buzzer 70 and also to one or more indicator lights 71. The controller 77 operates the audible alarm or buzzer 70 and any particular indicator lights 71 at particular times to alert an operator that action is necessary with the system.

For example, controller 77, upon determining that the kettle has reached a particular ingredient loading temperature point, will alert the operator to load the ingredients into the kettle. Once the kettle has cooked the ingredients and completely popped the popcorn, the controller will again alert the operator to dump the kettle, if manual dumping is necessary.

For each subsequent batch of popcorn, the operator will then be alerted to load ingredients for the next successive batch and will be alerted, in a manual dump situation, to dump the corn once that batch has been popped. Of course, in an automatic dump situation as described above, dumping will occur automatically.

Therefore, the present invention provides operator indications, either visibly or audibly, to alert an operator when they are supposed to take particular steps, such as adding ingredients and dumping popcorn.

In another aspect of the invention, the cooking process is modified to insure that the first cycle from a cold start, or alternately, the first and several following cycles from a cold start, are controlled to insure consistent popcorn quality is attained in following cycles when heat equilibrium of the system has been reached.

In particular, it will be appreciated from the foregoing detailed description of one embodiment of the invention that the control system, and specifically temperature controller 82, analyzes the cycle and the rate of heat rise of the kettle with respect to a control temperature or some other desired temperature. As the kettle temperature increases toward the desired temperature, the temperature controller 82 reduces the heat energy input by reducing energy to the heating element prior to reaching the desired temperature. The temperature, however, continues to climb in a controlled fashion toward the desired level, but is maintained by this process closer to the desired temperature without the wide margins of overshoot as in prior systems, such as where the heat elements are fully energized up until the desired set temperature is reached. The amplitude of maximum temperature variation around the desired temperature is significantly reduced, resulting in a close control of heat energy in the process, and a consistent high quality, good tasting popcorn. The temperature controller uses a PID or proportional integral derivative scheme to operate and control the kettle heater and kettle heat.

It has been discovered that if the same control logic is applied, however, to the heat energy in the first cycle from a cold start, or in immediately following cycles before the apparatus and sensors reach their own heat equilibrium, those cycles can be adversely affected to the extent they deviate from optimum cooking cycle. This occurs, for example, in the following manner.

Figure 9:
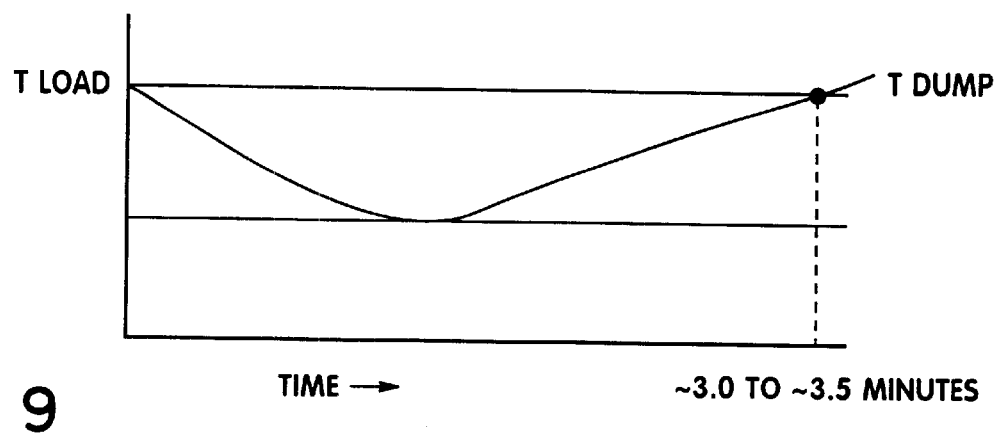
FIG. 9 is a graphical illustration of a popping process where Tload temperature is equal to a set Tdump temperature and shows the effect on time.
Figure 10:
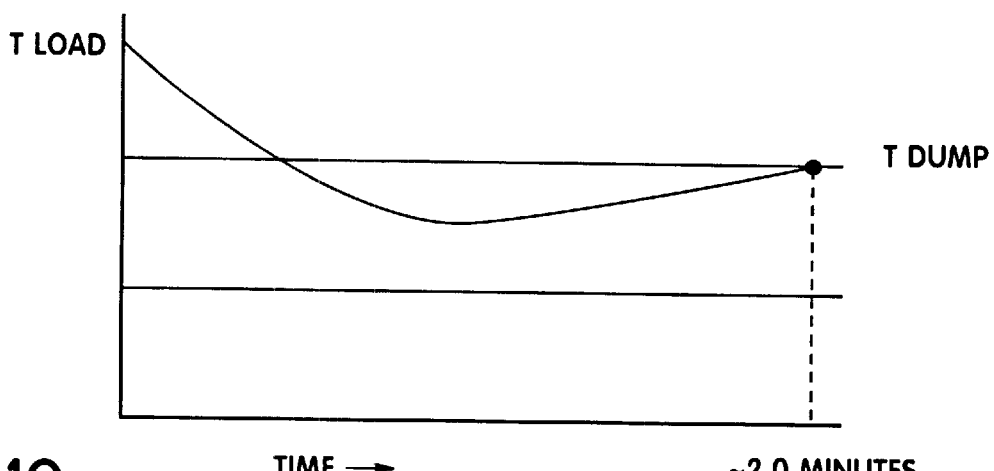
FIG. 10 is a graphical illustration of a popping process where Tload temperature is greater than the set Tdump temperature and shows the effect on time.
Figure 11:
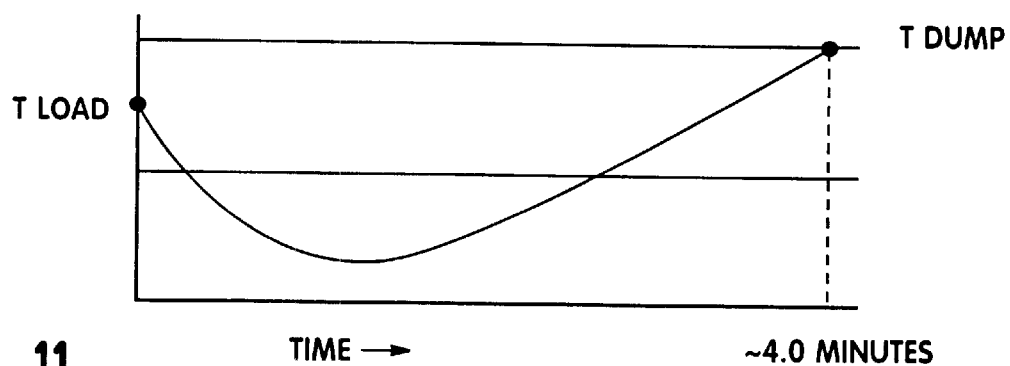
FIG. 11 is a graphical illustration of a popping process where Tload temperature is less than the set Tdump temperature and shows the effects on time.
Figure 12:
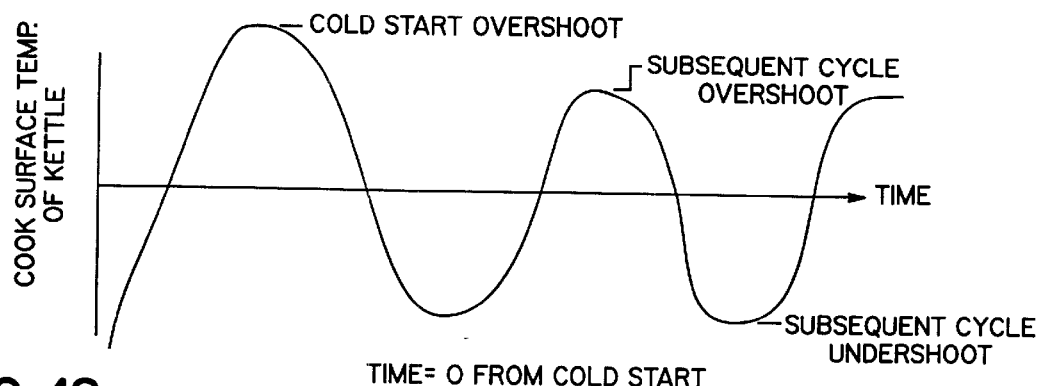
FIG. 12 is a graphical illustration showing a popping process of the prior art.
Figure 13:
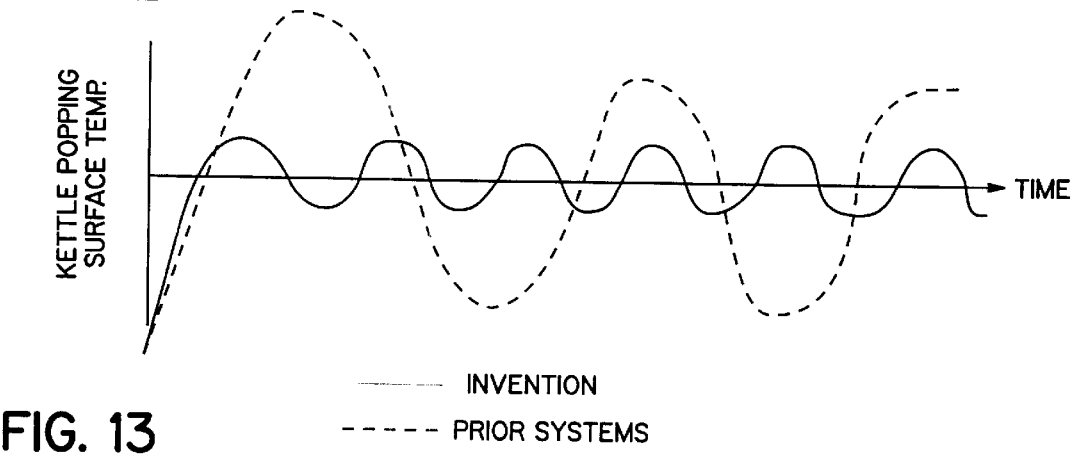
FIG. 13 is a graphical illustration showing kettle surface temperature cycles of a popping process of one embodiment of the invention compared to those of a prior popping system.

If the normal temperature controller PID logic is used on start up, as the kettle temperature rises toward the desired temperature in the initial cycle from a cold start, the controller senses the rate of rise and retards heat input as the temperature nears the desired temperature. The desired temperature may be a load temperature or Tload for cooking a first batch of popcorn. Since the kettle, and the sensor, and other heated components of the system have most likely not reached thermal equilibrium (as it exists for subsequent cycles after the first cycle or the first several cycles have run) the temperature or heat response of the apparatus is not the same as it is at subsequent cycles when equilibrium has been established. The corn and oil might be loaded at a load temperature under conditions which result in a cook time outside the preferred range of about 3.0 to about 3.5 minutes. Specifically, when the system is not at equilibrium, heat energy added to the kettle when ingredients are added will not all be directed to the ingredients. Rather, system components will continue to absorb heat energy away from the ingredients. As such, the load temperature may be below the desired point to begin the cook cycle and the ingredients will not be properly cooked when a dump temperature is reached. The FIGS. 9, 10 and 11 demonstrate the effect on time to reach a set, optimum dump temperature for various Tload temperatures when the corn and oil are actually loaded.

Accordingly, this embodiment of the invention contemplates a bypass of the PID aspects of the invention for the first or first few cooking cycles to insure the cook time from the loading of corn and oil to reaching Tdump temperature is within the preferred range of about 3.0 to about 3.5 minutes, and the corn is cooked properly.

Figure 16:
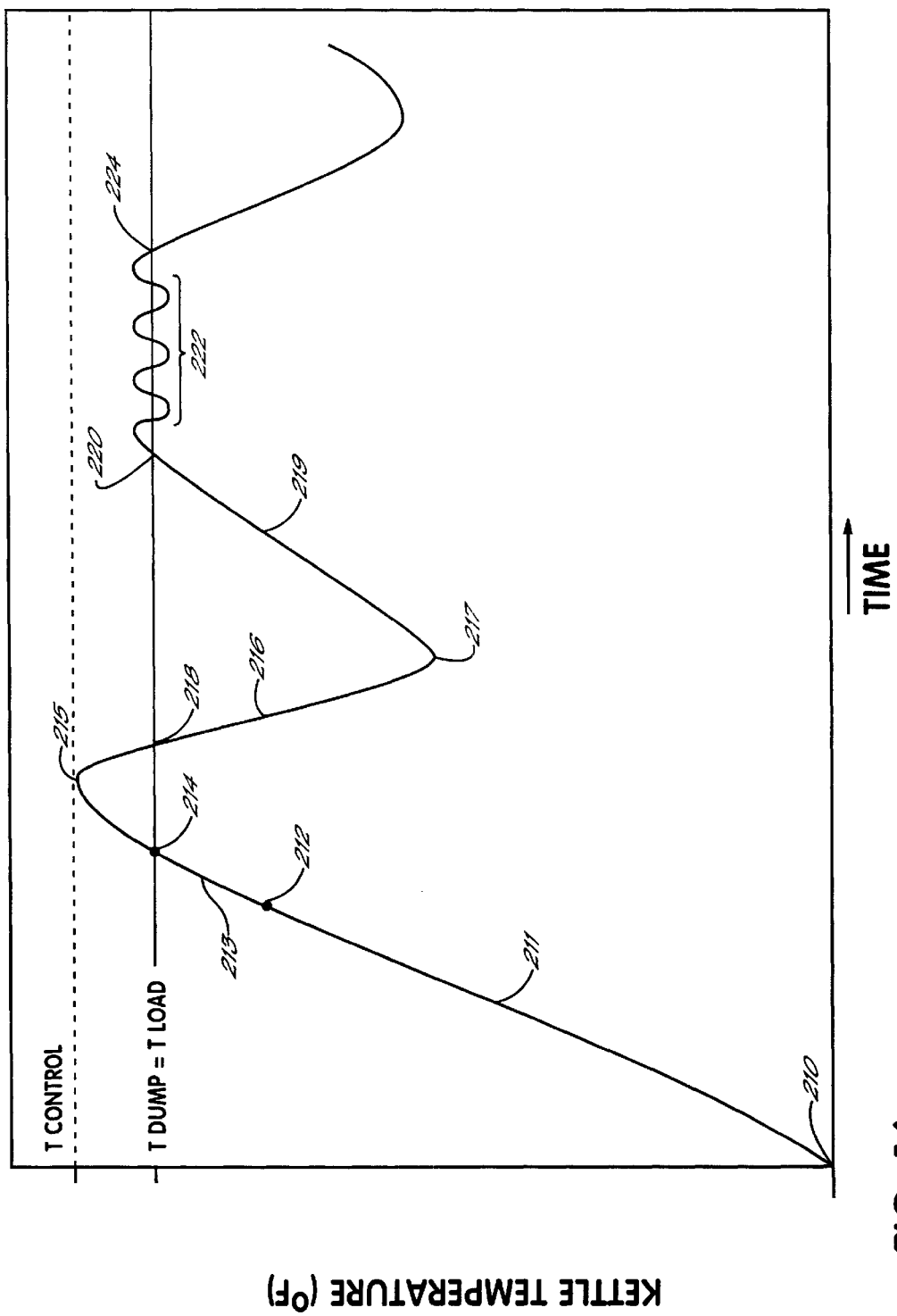
FIG. 16 is a temperature graph versus time of the kettle during popcorn cooking cycles for another embodiment of the invention.

FIG. 16 is a temperature graph versus time of the kettle during a popcorn cycle in accordance with one embodiment of the present invention. Specifically, at point 210, the system is turned on and the kettle heater begins heating the kettle such that the temperature rises according to slope 211. In the first cycle of the heater, where it is initially being heated up from a cold start, the PID aspects of the temperature controller 82 are not yet utilized in order to provide more consistent popping of the popcorn, even in the first cycle, or the first few cycles.

In earlier systems, the temperature controller 82 was incorporated immediately and therefore, as the kettle temperature approached a particular desired temperature, the controller 82 would operate the kettle heaters to slow down heating of the kettle so that the desired temperature is approached in a more controlled manner. However, in the first cycle, the components of the system including the kettle 18, kettle heater 88, thermocouple and other elements have not yet reached a thermal equilibrium.

As noted, it was discovered that upon introducing the temperature controller 82 and its PID aspects in the first cycle, that the first batch of popcorn would not cook properly. Specifically, the controller 82 would tend to slow the heating of the kettle down before all of the components have had a chance to reach their thermal equilibrium. Thus, when the ingredients were loaded, heat directed to the kettle and components, which should have been for the corn, would actually be absorbed as the various components try to reach their thermal equilibrium.

Therefore, in accordance with one aspect of the present invention, the controller 77 overrides the PID features of the temperature controller 82 for the first cycle and simply turns on the heaters and lets the kettle temperature ramp up toward a Tcontrol temperature which is essentially a high limit temperature. At some temperature prior to reaching Tcontrol, the kettle heater 88 is turned off, such as at point 212.

Due to the time and temperature lag within the system, which is cumulative for all the components in the system, the kettle will still continue to be heated, as indicated by the portion of the slope designated with reference numeral 213. In fact, the kettle temperature will pass up through a dump temperature or load temperature point 214 and will continue to approach Tcontrol. The controller 77, based upon the power of the heating elements and the overall mass of the kettle and components, will be programmed to turn the kettle heat off, such as at point 212, in order to insure that the overall temperature of the kettle does not reach and exceed Tcontrol.

Tcontrol, as discussed further hereinbelow, is a maximum limit temperature. If the kettle temperature reaches and exceeds Tcontrol, the kettle heat will turn off and remain off until the system can be adjusted or fixed. However, in the first cycle, the Tcontrol temperature is utilized as an upper limit and the controller 77 turns the kettle heaters off substantially below that point so that any temperature lag within the system will not bring the kettle temperature beyond Tcontrol. However, since no PID control is utilized, heat is directed to the kettle rapidly without a typical PID slowdown. In that way, the system gets closer to an equilibrium state on the first cycle.

As the kettle temperature passes through the Tload point 214, the operator is alerted to add ingredients, since the kettle is at the desirable cooking temperature.

If no ingredients are added, the kettle temperature will climb to its highest point as indicated by a peak point 215 and will then start to cool because the heater has been turned off. However, during normal operation, the operator will load the ingredients, such as popcorn and oil, which present a thermal load to the kettle as discussed hereinabove. The kettle heat then begins to plummet according to the portion of the curve indicated by numeral 216.

As the corn pops, the various ingredients absorb heat so that the kettle temperature continues to decrease down to a certain lowpoint 217. Controller 77 continues to monitor the kettle temperature and the controller knows that a cooking cycle has begun when the kettle temperature dips below some chosen temperature point, such as around 370 degrees.

Continuing in the cooking cycle, once the ingredients have absorbed sufficient heat to cook the popcorn, the kettle again begins to heat up from point 217 as the heaters continue to apply heat to the kettle. It should be noted that when the kettle temperature passes through the Tdump point or Tload 218, as it cools down after ingredients have been loaded, the PID features of the temperature controller 82 take over and the system is then under control of those PID features until the system is turned off and again begin with the next cold start cycle.

The PID features of the temperature controller 82 will kick in when the kettle temperature cools down, regardless of whether ingredients have been added. For example, even if no ingredients are added, the heater is turned off in the initial heat cycle at point 212 and therefore the kettle temperature will inherently cool down from its peak point 215 to Tdump at point 218. At that point, the PID features of the temperature controller 82 take over and the kettle heater will again be turned on to deliver heat to a batch of ingredients or to keep an empty kettle around the desired Tload/Tdump point.

As the heater continues to add heat to the kettle, the kettle temperature will begin rising, as designated by the portion of the graph indicated with reference numeral 219. However, the control of the heater, and therefore the kettle temperature, at that point is within the PID aspects of controller 82. Therefore, the temperature will ramp up more gradually to a Tdump point in those cycles subsequent to the first cycle.

Once the kettle heats up to the Tdump point 220, several things might occur. In a system which utilizes a manual dump, the controller 77 will audibly and/or visibly alert an operator, such as through an audible buzzer 70 or indicator light 71, that the load needs to be dumped. This is particularly important as an operator may be busy and distracted and the popcorn must be dumped before it burns. Burnt popcorn is a significant problem in certain vending situations. Alternatively, if the system is operable to automatically dump the kettle, the kettle may be automatically dumped at temperature point 220. Controller 82 then operates the kettle heater, such that the kettle heat is maintained around the Tload/Tdump temperature as indicated by reference numeral 222. As the system reaches equilibrium, the overshoots associated with region 222 will decrease for subsequent cycles.

At that point, the next batch of ingredients should be loaded. Therefore, the Tdump is also indicated as Tload. Once the next batch of ingredients is loaded, such as at point 224, the temperature of the kettle will again drop as it repeats another cooking cycle as previously described. For each subsequent cycle, the kettle and kettle heater are under the control of the PID aspects of the temperature controller.

While one embodiment of the invention is described with respect to bypassing the PID aspects of the temperature controller for the first cycle, so that the system may reach equilibrium and the first batch of popcorn is cooked properly, such a feature may be incorporated with more than the first cycles, such as the first two or three cycles, in order to insure that equilibrium is properly obtained before turning the kettle heater over to the control of the PID aspects of the temperature controller. Therefore, the invention is not limited to simply a single override of normal kettle temperature control within the first cycle.

As discussed above, should the kettle temperature meet or exceed the set Tcontrol temperature, the controller 77 recognizes an over temperature condition and will shut off the heater to the kettle.

Figure 15:
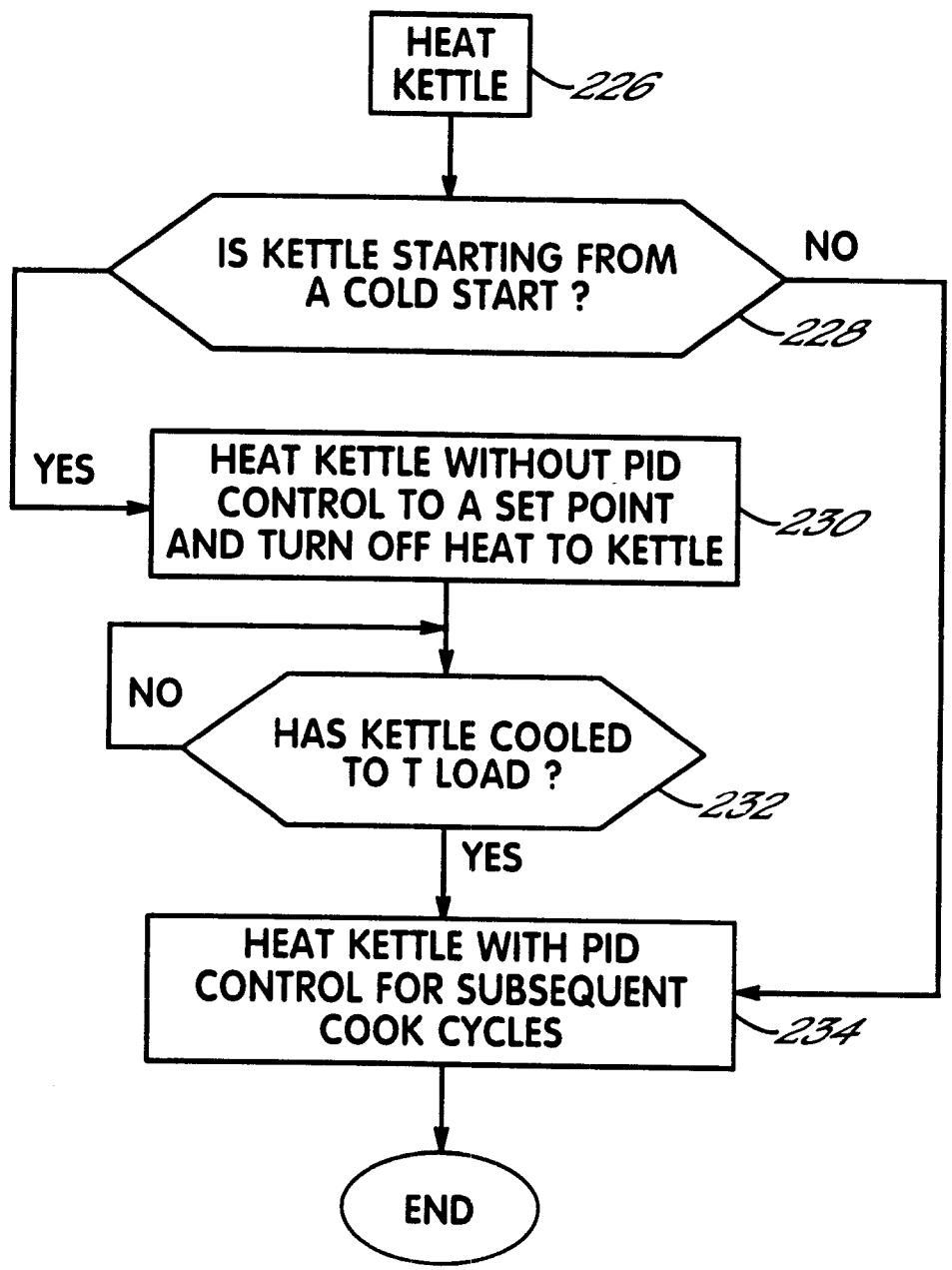
FIG. 15 is an operational flow chart similar to FIG. 7 but illustrating an alternative embodiment of the invention.

FIG. 15 discloses a flow chart for operation of one embodiment of the kettle where, more specifically, the kettle is heated according to step 226. The controller 77 determines if the kettle is starting from a cold start (step 228). If it is, the kettle is heated without PID control to a set point and the heater is then turned off (step 230). Then, controller 77 determines if the kettle temperature is cooled to Tload. If it has, whether that is through the kettle simply cooling down because heat to the kettle was turned off, or the loading of ingredients, the controller 77 initiates the PID aspects of the temperature controller 82 for subsequent cooking cycles (steps 232 and 234). If the kettle is not starting from a cold start as it is being heated, the PID control aspects are utilized (step 234).

Again, while the example is given for a single start up cycle, numerous cycles might be utilized from a cold start before equilibrium is reached, and therefore control of the kettle heating may not be turned over to the PID aspects of temperature controller 82 until after several cycles.

In another aspect of the invention, the foregoing detailed description describes the delivery of oil by means of a pump and timer. It has been found that calibration of the timer is an awkward, trial and error process, not enjoyed by most operators. Accordingly, this invention further contemplates the use of the controller 77 to control delivery of consistently measured amounts of oil. The controller is operable to be placed in a learn mode upon the initial cooking situations. The pump is started and oil is dispensed into a desired measurement receptacle. When the exact amount is dispensed, the pump is stopped. The control system "learns" this sequence to so that any further initiation of the oil dispensing cycle causes the same amount of oil to be dispensed. Therefore, the aforementioned timer and trial and error process is wholly eliminated with the control provided by controller 77.

For example, when initially beginning the cooking of popcorn, the oil system is placed in a measurement mode in order to set how much oil will be automatically added each time in the cooking cycle or will be added manually upon engagement of an oil pump button or switch at the start of a cook cycle.

The timer associated with the oil pump is bypassed with the controller 77 controlling the pump timing in order to deliver the proper amount of oil for each batch of popcorn. To that end, oil pump control circuitry 200 is operably coupled to the controller 77 to place the controller 77 in a "learn" mode (see FIG. 14).

Upon initiating the oil pump control circuitry 200 to place the controller 77 in a learn mode, and upon engaging the pump switch 106, the oil pump begins pumping oil and the controller 77 monitors how long the oil pump switch is engaged. The oil pump control 200 places the controller 77 into a learn mode so that it monitors the length of time that the switch 106 is engaged. Once the switch 106 is disengaged, the controller 77 remembers the particular length of time. In that way, a particular length of time may be associated with a particular amount of oil being dispatched. The oil pump control circuitry 200 may be implemented with the existing circuitry, such as by manipulating, in sequence, switch 106 and other switches associated with the oil pump and coupled to controller 77.

As an example, the oil pump may be capable of dispensing one half of a cup of an oil in 2 to 3 seconds. If the oil pump control 200 is engaged and the controller 77 is set up to learn, the controller 77 will remember the time of 2 to 3 seconds that the switch is initially engaged and will dispense the amount of oil associated with that time, that is, approximately one half of a cup of oil. The controller may then be taken out of learn mode by control 200. Thereafter, each time switch 106 is engaged, approximately one-half cup of oil is dispensed.

To determine the proper amount of oil, an operator may hold a measuring implement, such as a measuring cup, under the oil inlet leading to the kettle. The switch 106 is then engaged for a particular amount of time in order to deliver a desired amount of oil to the measuring cup. Once that desired amount of oil has been delivered, the controller will remember.

For each subsequent batch of popcorn, the controller will operate the oil pump 104 to dispense oil for a particular amount of time. In that way, the trial and error associated with setting a specific oil pump timer to deliver the proper amount of oil, is eliminated. Rather, the operator may watch the amount of oil which is initially delivered and will disengage the switch 106 when the proper amount is delivered. Assuming that the oil pump is consistent in its pumping rate, the controller 77 will then remember the time and operate the pump for the proper time to insure the proper amount of oil. The operator does not care about the specific time, but rather wants to insure that a specific amount of oil is added each time, regardless of how long the oil pump has to operate to do so. Therefore, the present invention insures that a proper amount of oil is added each time and eliminates the need for the operator to adjust oil pump timers and the trial and error process to measure the oil added to the kettle.

In another aspect of the invention, it is noted that popcorn machines may be used not only to pop corn with a salt seasoning, but also to pop corn in sugar, producing a coated, sweet caramel-like tasting popcorn product. This product is perhaps more popular in European environments than in U.S. Use of a popper according to any embodiment described above can produce such product, but if the same temperatures are used, the sugar can be heated too much and burned. Accordingly, one embodiment of the invention contemplates the use of control circuitry enabling the cooking temperatures to be adjusted to the popcorn product desired. While this may be at the expense of optimum popped corn when lower temperatures are selected for "sugar" corn, other operating processes as described herein are retained.

Specifically, salt popcorn may be popped at a temperature of, for example, 525 degrees F. However, popping sugar popcorn at such a temperature would burn the sugar. Therefore, one embodiment of the present invention utilizes a cooking temperature control circuit 202 which is coupled to controller 77 for varying the cooking temperature of the kettle through the temperature controller 82.

Specifically, the cooking temperature control circuit 202 may include a number of switches or other circuits, such as circuit jumpers, such that it is slightly higher for salt popcorn and slightly lower for sugar popcorn. The cooking temperature control circuit 202 may be set during manufacturing, such as by utilizing specific jumpers associated with controller 77 to select a temperature for Tload/Tdump. Each jumper may represent a certain temperature range for reducing a salt corn temperature of Tload to a sugar corn Tload. More precise temperature adjustments might be provided by using potentiometers with the jumper to vary the selected temperature with controller 77.

Alternatively, the cooking temperature control circuit 202 might be accessible to the operator, such that the operator may select the type of popcorn to be cooked. For example, a simple two-position switch might be used, with one for salt and one position for sugar.

Generally, popcorn poppers will be set up for cooking one type of popcorn and will not be switched back and forth between types of popcorn. For a single use situation, hard wiring of a cooking temperature control circuit 202 at the manufacturing level may be desirable. However, if a particular machine will be switched back and forth and do double duty with both salt popcorn and sugar popcorn, operator-accessible control circuitry might be utilized.

In yet another aspect of the invention, it is desirable to provide a visual indicator in a popper that the kettle is not ready for corn loading, such as before the kettle temperature has reached Tload. Accordingly, on startup, the controller in an automatic dump machine tilts the kettle, such as to a 45 degree angle, for example, to indicate it is in a non-loading portion of the cycle. The kettle is leveled when its temperature reaches a desired Tload to visually indicate it is ready for loading. The control system accomplishes this similar to the way in which the kettle is controlled for an automatic dump as will be understood by a person of ordinary skill in the art from the foregoing description.

Finally, it will be appreciated one embodiment of the invention contemplates a manual operation of the kettle position through dump and return, and which is particularly enhanced by the provisions of the load and dump alarms described above.

The present invention also provides the proper amount of heat to maximize kernel expansion at popping. With the heat maintained at the proper level, the temperature of the corn and the steam pressure in the kernels will cooperate to provide consistent and high kernel expansion. With the present invention, popping expansion of rates of 1:50 have been achieved which are a significant improvement over the 1:44 or lower rates achieved by the prior art.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, applicant intends to be bound only by the claims appended hereto.

What is claimed is:

1. A method of popping popcorn comprising the steps of:
heating a kettle to a first temperature and cycling the kettle heat about said first temperature,
loading corn and oil into said kettle to pop the corn,
raising the temperature of the kettle to a second predetermined kettle dump temperature in a popping cycle time period from about 3.0 to about 3.5 minutes from the time corn and oil is loaded into the kettle until the second predetermined dump temperature is reached.

2. The method as in claim 1 including the step of dumping popped popcorn from said kettle when said second dumping temperature is reached.

3. The method as in claim 1 including generating an alarm when said second dump temperature is reached.

4. The method as in claim 1 including generating an alarm when said first temperature is reached.

5. The method as in claim 1 including the steps of generating alarms when said first temperature is reached and when said second dump temperature is reached.

6. The method as in claim 1 including automatically tilting said kettle, upon first energizing said kettle from a cold start, until said first temperature is reached to signal that said kettle is not ready to be loaded with corn and oil.

7. The method as in claim 1 including popping a plurality of popcorn types in the same kettle and comprising the further steps for a second type of corn of:

heating said kettle to a third temperature and cycling the kettle heat about said third temperature;

loading the second type of corn and oil into said kettle to pop the second type of corn;

raising the temperature of said kettle to a fourth predetermined kettle dump temperature in a popping cycle from said third temperature, and wherein said first and second temperatures comprise one set of temperatures, said third and fourth temperatures comprise a second set of different temperatures and further comprising the step of selecting the first or second set of temperatures prior to initiating a popping cycle.

8. An electronic control for a popcorn popping kettle having heating elements for heating a popping surface of the kettle to pop popcorn kernels when kernels and oil are placed in the kettle, the popped kernels then being dumped from the kettle, said electronic control comprising:

a thermocouple disposed on said kettle for sensing kettle temperature;

an electronic circuit for operating said heating elements by connecting them to a source of energy in response to a first sensed temperature by said thermocouple and by disconnecting them from said source of energy responsive to a second higher sensed temperature by said thermocouple;

said thermocouple being operably interconnected to said electronic circuit for activating and deactivating said elements in response to said temperatures sensed by said thermocouple to raise the temperature of said popping surface from a reduced temperature occurring when kernels are loaded thereon to a dump temperature when said kernels are substantially popped; and wherein said first and second temperatures are selected to cause the kettle's popping surface to reach a desired dump temperature throughout a cycle duration from popcorn kernel and oil kettle loading through popped popcorn dumping of about 3.0 to about 3.5 minutes.

9. The electronic control as in claim 8 wherein said cycle duration is substantially the same for a first batch of popcorn from a cold start as for subsequent batches of popcorn from a kettle retaining heat from prior batches.

10. The electronic control of claim 8 wherein said thermocouple is disposed on a portion of said kettle removed from said popping surface, and wherein said thermocouple signals said electronic circuit to activate and deactivate said heating elements in response to sensing respective temperatures as a function of said first and second temperatures.

11. The electronic control of claim 8 further including an alarm operatively coupled to said electronic circuit for signaling optimum time for first loading popping corn kernels and oil into said kettle and for dumping popped popcorn from said kettle at the end of a cycle when said dump temperature is reached.

12. The method of claim 1 wherein substantially all the kernels added to the kettle together are popped within the cycle of about 3.0 minutes to about 3.5 minutes.

13. The method of claim 12 wherein the popping of kernels within the cycle is independent of decreased energy source capacity and variations in the quantity of popcorn and oil added to the kettle from one cycle to another.

14. The electronic control of claim 8 herein said heating elements are energized to raise the kettle to a higher kettle temperature upon first start from a cold kettle as compared to raising the kettle to a lower kettle temperature for subsequent cycles of popping.

15. The electronic control as in claim 8 further including an electronic oil delivery circuit for dispensing measured amounts of oil after a first learned dispensing cycle wherein a pump is started to dispense an amount of oil into a measured receptacle and then stopped and said cycle is recorded by said oil delivery circuit and thereafter repeated upon subsequent pump energizing to dispense like measured amounts.

16. An electronic control for a popcorn popping kettle having heating elements for heating a popping surface of the kettle to pop popcorn kernels when kernels and oil are placed in the kettle, the popped kernels then being dumped from the kettle, said electronic control comprising:

a temperature sensor associated with said kettle for sensing kettle temperature;

an electronic circuit responsive to said temperature sensor and coupled to said heating elements for heating said popping surface of the kettle to a cooking temperature to pop the popcorn kernels; and a control circuit operatively coupled to said electronic circuit for selectively changing said cooking temperature between a first cooking temperature and a second different cooking temperature.

17. The electronic control of claim 16 wherein said temperature sensor comprises a thermocouple.

18. A method of popping a plurality of popcorn types in a kettle comprising the steps of:

heating a kettle to a cooking temperature selected from a plurality of preset cooking temperatures, each of said plurality of preset cooking temperatures being associated with one of said plurality of popcorn types;

loading one of said plurality of popcorn types into said kettle; and cooking said popcorn type at the preset cooking temperature associated with said popcorn type.

* * * * *

UNITED STATES PATENT AND TRADEMARK OFFICE
CERTIFICATE OF CORRECTION

PATENT NO. : 6,534,103 B2
DATED : March 18, 2003
INVENTOR(S) : Ronald R. Weiss

It is certified that error appears in the above-identified patent and that said Letters Patent is hereby corrected as shown below:

Column 1,
Line 26, change "to a automatic or manual popcorn poppers" to
-- to automatic or manual popcorn poppers --.
Line 54, change "mass-producing popcorn;" to -- mass-producing popcorn, --.

Column 3,
Line 8, change "Improvement in the popping machines or equipment"
to -- Improvements in the popping machines or equipment --.
Line 45, change "temperature can be reached is a desired time period" to
-- temperature can be reached in a desired time period --.

Column 4,
Line 14, change "after the corn and oil is loaded" to
-- after the corn and oil are loaded --.
Line 51, change "corn kernels and oil is loaded into" to -- corn kernels and oil are loaded into --.
Line 60, change "ump" to -- dump --.
Line 67, change "good tasting popcorn, the process" to
-- good tasting popcorn, and the process --.

Column 5,
Line 24, change "at different Tload temperature" to -- -at different Tload temperatures --.

Column 6,
Line 32, change "believed to be one of the be most significant" to
-- believed to be one of the most significant --.
Line 45, change "and too long or time is" to -- and too long of time is --.

Column 7,
Line 47, change "amount of oil pump is then added by the oil pump system" to
-- amount of oil is then added by the oil pump system --.

Column 9,
Line 65, change "and the PLC that the minimum temperature" to
-- and the PLC senses that the minimum temperature --.

UNITED STATES PATENT AND TRADEMARK OFFICE
CERTIFICATE OF CORRECTION

PATENT NO. : 6,534,103 B2
DATED : March 18, 2003
INVENTOR(S) : Ronald R. Weiss

It is certified that error appears in the above-identified patent and that said Letters Patent is hereby corrected as shown below:

Column 12,
Line 11, change "3.0 to abut 3.5 minutes" to -- 3.0 to about 3.5 minutes --.
Line 17, change "function as a safety or cutoff temperature," to -- functions as a safety or cutoff temperature, --.
Line 30, change "to produce a non-consistently high quality product." to -- to produce a consistently high quality product. --.
Line 40, change "BRIEF DESCRIPTION OF THE DRAWING" to -- BRIEF DESCRIPTION OF THE DRAWINGS --.
Line 52, change "FIG. 1B is perspective view of" to -- FIG. 1B is a perspective view of --.
Line 57, change "FIG. 4 is a perspective-view of" to -- FIG. 4 is a perspective view of --.

Column 15,
Line 3, change "popped pop corn" to -- popped popcorn --.

Column 17,
Line 36, change "heating up-upon initial powerup." to -- heating up upon initial powerup. --.

Column 19,
Line 19, change "an-oil bucket or pail" to -- an oil bucket or pail --.

Column 20,
Line 49, change "the profitability of the entire operation, is increased." to
-- the profitability of the entire operation, are increased. --.

Column 22,
Line 33, change "sounding and light flashing 71," to -- sounding and light 71 flashing, --.
Line 65, change "when a new ingredients load is need and a" to
-- when a new ingredients load is needed and a --.

Column 23,
Line 59, change "the output from the temperature control cycles oscillates from"
to -- the output from the temperature controller oscillates from --.

UNITED STATES PATENT AND TRADEMARK OFFICE
CERTIFICATE OF CORRECTION

PATENT NO. : 6,534,103 B2
DATED : March 18, 2003
INVENTOR(S) : Ronald R. Weiss

It is certified that error appears in the above-identified patent and that said Letters Patent is hereby corrected as shown below:

Column 28,
Line 41, change "this sequence to so that" to -- this sequence so that --.
Line 44, change "error process is wholly eliminated" to -- error process are wholly eliminated --.

Column 30,
Line 43, change "popping expansion of rates of 1:50 have" to -- popping expansion rates of 1:50 have --.
Line 49, change "intention of the applicants" to -- intention of the applicant --.
Line 66, change "from the time corn and oil is loaded" to -- from the time corn and oil are loaded --.

Column 32,
Line 19, change "electronic control of claim 8 herein" to -- electronic control of claim 8 wherein --.

Signed and Sealed this

Second Day of December, 2003

JAMES E. ROGAN
*Director of the United States Patent and Trademark Office*